United States Patent
Patil et al.

(10) Patent No.: US 11,196,846 B2
(45) Date of Patent: Dec. 7, 2021

(54) INLINE ENCRYPTION OF PACKET DATA IN A WIRELESS COMMUNICATION SYSTEM

(71) Applicant: Facebook Technologies, LLC, Menlo Park, CA (US)

(72) Inventors: Dinesh Patil, Sunnyvale, CA (US); Wojciech Stefan Powiertowski, Kirkland, WA (US); Neeraj Upasani, Redmond, WA (US); Sudhir Satpathy, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/860,983

(22) Filed: Apr. 28, 2020

(65) Prior Publication Data

US 2021/0149830 A1 May 20, 2021

Related U.S. Application Data

(60) Provisional application No. 63/004,315, filed on Apr. 2, 2020, provisional application No. 63/004,170, filed
(Continued)

(51) Int. Cl.
*G06F 3/00* (2006.01)
*H04L 29/06* (2006.01)
(Continued)

(52) U.S. Cl.
CPC .............. *H04L 69/22* (2013.01); *G06F 13/28* (2013.01); *G06F 13/4063* (2013.01);
(Continued)

(58) Field of Classification Search
CPC ........ G06F 13/28; G06F 21/79; G06F 21/602; G06F 13/4063; H04W 28/14
See application file for complete search history.

(56) References Cited

U.S. PATENT DOCUMENTS 8,244,305 B2 * 8/2012 Ramesh ................ H04L 65/607
455/563
10,372,656 B2 * 8/2019 Varadarajan .......... H04W 12/02
(Continued)

FOREIGN PATENT DOCUMENTS

| AU | 2004297922 B2 | 7/2008 |
| WO | 2005/057964 A1 | 6/2005 |

OTHER PUBLICATIONS

McGrew et al., "The Galois/Counter Mode of Operation (GCM)," Conference Proceedings 2005,43 pp.(Applicant points out, in accordance with MPEP 609.04(a), that the year of publication, 2005, is sufficiently earlier than the effective U.S. filing date, so that the particular month of publication is not in issue.).
(Continued)

*Primary Examiner* — Jing-Yih Shyu
(74) *Attorney, Agent, or Firm* — Shumaker & Sieffert, P.A.

(57) ABSTRACT

In an example of the described techniques, a wireless communication system includes first memory, second memory, a direct memory access (DMA) controller, an encryption engine in-line between the DMA controller and the second memory, a first microprocessor, and a second microprocessor. The first microprocessor communicates with other systems that generate application data to be wirelessly transmitted. The application data to be wirelessly transmitted is stored in the second memory and programs the DMA controller to transfer packets of the application data to the first memory from the second memory. The encryption engine receives the packets of the application data from the DMA controller, encrypts the packets to generate encrypted application data packets, and outputs the encrypted application data packets for storage to the first memory.

18 Claims, 15 Drawing Sheets

Related U.S. Application Data on Apr. 2, 2020, provisional application No. 62/940,780, filed on Nov. 26, 2019, provisional application No. 62/935,964, filed on Nov. 15, 2019.

(51) Int. Cl.

| | | |
|---|---|---|
| *H04B 7/26* | (2006.01) | |
| *H04L 12/741* | (2013.01) | |
| *G06F 13/28* | (2006.01) | |
| *G06F 13/40* | (2006.01) | |
| *G06F 21/60* | (2013.01) | |
| *G06F 21/79* | (2013.01) | |
| *H04W 28/14* | (2009.01) | |

(52) U.S. Cl.
CPC ............ *G06F 21/602* (2013.01); *G06F 21/79* (2013.01); *H04B 7/26* (2013.01); *H04L 45/745* (2013.01); *H04L 63/0428* (2013.01); *H04W 28/14* (2013.01)

(56) References Cited

U.S. PATENT DOCUMENTS

| | | | | |
|---|---|---|---|---|
| 2003/0031320 | A1* | 2/2003 | Fan | H04L 63/04 380/255 |
| 2005/0111472 | A1* | 5/2005 | Krischer | H04W 12/033 370/412 |
| 2006/0014522 | A1* | 1/2006 | Krischer | H04L 65/607 455/410 |
| 2008/0209203 | A1* | 8/2008 | Haneda | G06F 21/72 713/150 |
| 2015/0355800 | A1 | 12/2015 | Cronin | |
| 2018/0122271 | A1 | 5/2018 | Ghosh et al. | |
| 2018/0145951 | A1* | 5/2018 | Varadarajan | G06F 13/28 |

OTHER PUBLICATIONS

Kite, "Understanding PDM Digital Audio," Audio Precision, Jan. 11, 2012, 9 pp.

Waterman et al., "The RISC-V Instruction Set Manual, vol. II: Privileged Architecture. Version 1.10 Chapter 7," May 7, 2017, 13 pp.

IEEE Std 802.11ad-2012: "Part 11: Wireless LAN Medium Access Control (MAC) and Physical Layer (PHY) Specifications— Amendment 3: Enhancements for Very High Throughput in the 60 GHz Band", LAN/MAN Standards Committee of the IEEE Computer Society, Dec. 28, 2012, 628 Pages.

"SMS4 Encryption Algorithm for Wireless Networks," Version 1.03, May 15, 2008, 6 pp. (translated by Diffie et al.).

Aoki et al., "Specification of Camellia—a 128-bit Block Cipher," NTT and Mitsubishi Electric Corporation, Sep. 26, 2001, 35 pp.

"Announcing the Advanced Encryption Standard (AES)," Federal Information Processing Standards Publication 197, Nov. 26, 2001, 51 pp.

U.S. Appl. No. 16/694,744, filed Nov. 25, 2019, by Satpathy et al.
U.S. Appl. No. 16/506,618, filed Jul. 9, 2019, by Atlas et al.
U.S. Appl. No. 16/860,991, filed Apr. 28, 2020, by Patil et al.
International Search Report and Written Opinion of International Application No. PCT/US2020/055971, dated Jan. 22, 2021, 9 pp.

\* cited by examiner

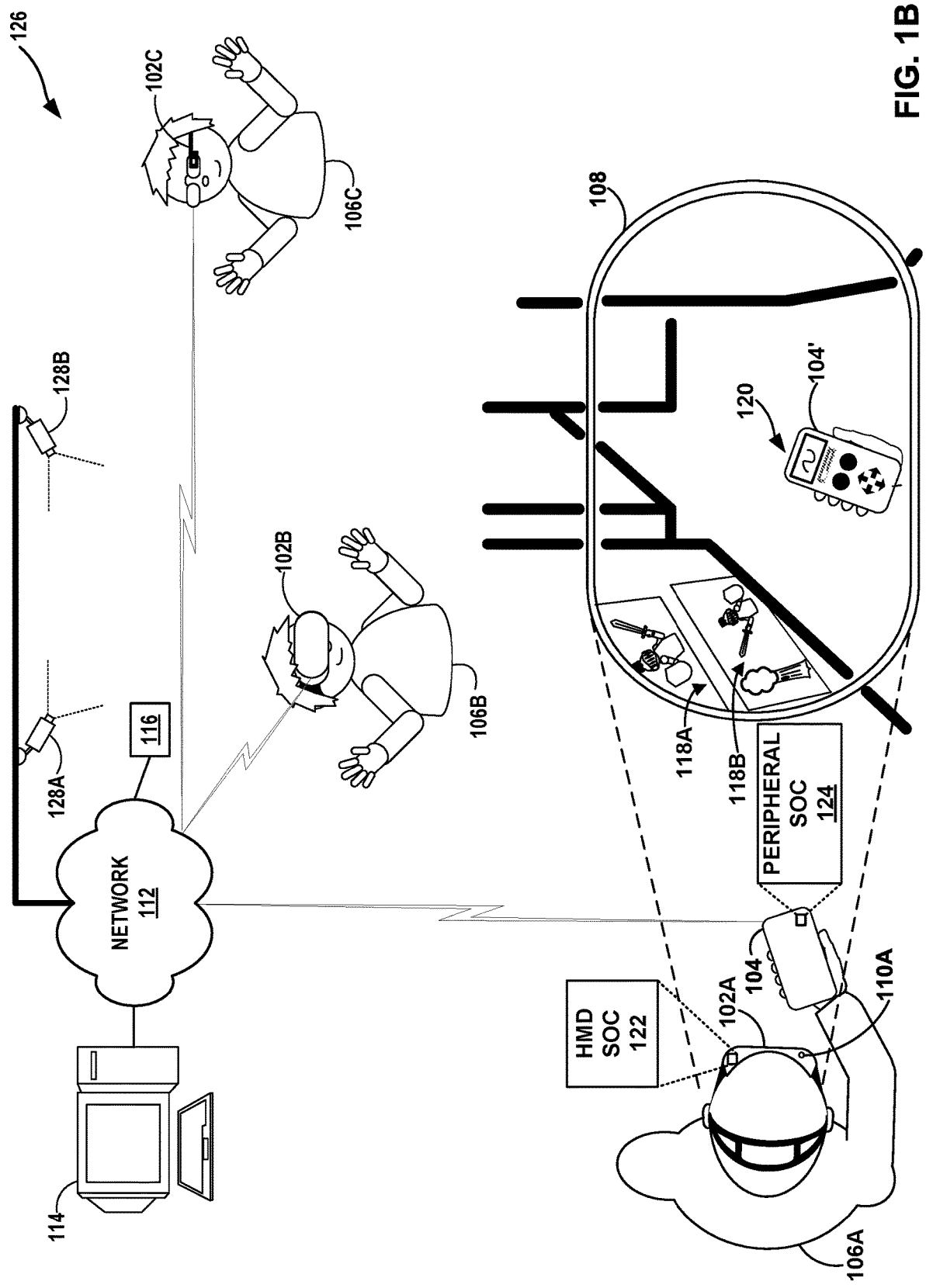

INLINE ENCRYPTION OF PACKET DATA IN A WIRELESS COMMUNICATION SYSTEM

This application claims the benefit of U.S. Provisional Application No. 63/004,315 filed Apr. 2, 2020, U.S. Provisional Application No. 63/004,170, filed Apr. 2, 2020, U.S. Provisional Application No. 62/940,780 filed Nov. 26, 2019, and U.S. Provisional Application No. 62/935,964, filed Nov. 15, 2019, the entire content of each of which are herein incorporated by reference.

TECHNICAL FIELD

In general, this disclosure relates to wireless communication systems.

BACKGROUND

Devices communicate wirelessly using one or more wireless protocols. Wireless protocols include the WiFi standards (IEEE 802.11 and subsequent amendments, e.g., 802.11a, 802.11b, 802.11g, 802.11ad, and so forth), Bluetooth, LorRa, Zigbee, and others. Wireless communications involve transmitting packetized data over the air from a source device to a destination device using a wireless physical layer link.

SUMMARY

As described below, a wireless communication system includes multiple microcontrollers to manage the transfer of data between shared memory and one or more wireless transceivers. The wireless communication system includes a wireless microcontroller (WMCU) that manages drivers for the wireless transceivers and orchestrates data movement between the I/O ports associated with the wireless transceivers and physical memory that includes, for example, a transmission buffer and a reception buffer (sometime referred to as "wireless memory" or "WMEM"). The wireless communication system includes an isolation microcontroller (IMCU) that communicates with other memory management components of the wireless communication system to, for example, prepare packets for transmission by the wireless transceivers. The shared memory is memory that is accessible to multiple subsystems (e.g., different system-on-a-chip (SoC) integrated circuits, etc.) of a device via a memory data bus (e.g., a network-on-a-chip (NoC) data bus). The shared memory may be physically isolated, e.g., a different memory device, from the wireless memory. While the isolation microcontroller has access to the shared memory and the wireless memory, the isolation microcontroller controls access to the shared memory such that the wireless microcontroller does not have direct access to the shared memory.

A subsystem that has application data to be transmitted over a wireless transceiver places the data to be transferred and a header (collectively referred to as "application data") into the shared memory. The subsystem then provides the location of the application data to the isolation microcontroller. The isolation microcontroller creates packets and corresponding packet headers from the application data, and the isolation microcontroller orchestrates data movement between the shared memory and the wireless memory. In this way, access to shared memory by a microcontroller or other processing circuitry that is processing received wireless packets is mediated by the isolation microcontroller.

In some examples, the wireless microcontroller executes the full set of one or more drivers for the wireless transceivers, but the isolation microcontroller may execute a more limited code to orchestrate data movement and manage packetization. In addition, the wireless microcontroller may only have access to the wireless memory. Because malformed packets may be used to exploit vulnerabilities of the drivers executed by the wireless microcontroller, bifurcating the data movement and wireless transceiver control between the isolation microcontroller and the wireless microcontroller may improve the security of the wireless communication system by reducing, and in some cases eliminating, vulnerabilities of the engines and the isolation microcontroller to malformed packets received by the wireless transceivers and stored to wireless memory.

In some examples, the wireless communication system includes an inline encryption/decryption engine to encrypt and decrypt packets on a data path, managed by the isolation microcontroller, between the shared memory and the wireless transceivers. For example, the isolation microcontroller creates encryption headers in the wireless memory for packets to be formed from application data generated by other engines of a device that includes the wireless communication system. The isolation microcontroller may program a direct memory access (DMA) controller (e.g., via control and status register writes, etc.) to direct the packets from shared memory along with corresponding packet headers from wireless memory to the encryption/decryption engine. The encryption/decryption engine generates encrypted packets that the programmed DMA controller then writes to wireless memory. That is, the isolation microcontroller communicates with subsystems that generate application data for wireless transmission, creates headers and packets from the application data in the shared memory, and orchestrates data movement between the shared memory and the wireless memory using the DMA controller. The isolation microcontroller also manages the data path for encrypted packets received by the wireless communication system to ensure inline decryption by the encryption/decryption engine. The isolation microcontroller then signals the wireless microcontroller when encrypted packets are ready to be transmitted.

The wireless microcontroller, which executes the drivers for the wireless transceiver, signals the isolation microcontroller indicating new received, encrypted packets. In response, the isolation microcontroller may program the DMA controller to direct received, encrypted packets from the wireless memory to the encryption/decryption engine, which decrypts the packets with headers from the encrypted packets, and the programmed DMA controller writes the packet data to application payload destination memory allocated in the shared memory. In this way, the application payload is stored to shared memory of a destination device in the same image as the application payload was in the shared memory of the sender device.

In some cases, the encryption/decryption engine for the wireless communication system increments an encryption packet counter for every packet encrypted by the engine. The packet counter value is then transmitted in the header along with the packet. On the receiver side, the counterpart encryption/decryption engine reads the packet counter from the header and initializes local decryption using a local copy of the nonce and the received packet counter. In this way, each packet can be decrypted and validated individually, and the loss of a packet has no impact on future or past packets.

In one example, a wireless communication system includes first memory, second memory, a direct memory access (DMA) controller, an encryption engine in-line between the DMA controller and the second memory, a first microprocessor, and a second microprocessor. The first microprocessor communicates with other systems that generate application data to be wirelessly transmitted. The application data to be wirelessly transmitted is stored in the second memory and programs the DMA controller to transfer packets of the application data to the first memory from the second memory. The encryption engine receives the packets of the application data from the DMA controller, encrypts the packets to generate encrypted application data packets, and outputs the encrypted application data packets for storage to the first memory.

In another example, a wireless communication system includes first memory, second memory, a first microprocessor, a direct memory access (DMA) controller, and an encryption engine in-line between the DMA controller and the first memory. The first microprocessor programs the DMA controller with a first address in the first memory identifying a location of transmission packets and a second address identifying a second location in the second memory. The DMA controller pulls the transmission packets through the encryption engine to generate application data packets and stores the application data packets at the second location of the second memory. The encryption engine decrypts encrypted application data packets within the transmission packets.

In another example, a method includes pulling from first locations in a first memory, by a direct access memory (DMA) controller, transmission headers to an encryption engine in-line between the DMA controller and a second memory. The method also includes pulling from second locations in the second memory, by the DMA controller, packets of application data to the encryption engine. Additionally, the method includes completing, by the encryption engine, an encryption block within each of the transmission headers. The method includes encrypting, by the encryption engine, the packets of the application data. Furthermore, the method includes storing in third locations in first memory, by the DMA controller, transmission packets each comprising one of the completed transmission headers and the corresponding encrypted packet of the application data.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example multi-device artificial reality system that implements a wireless communication system providing improved security and data movement for wireless communication, in accordance with aspects of this disclosure.

Like reference characters denote like elements throughout the text and figures.

DETAILED DESCRIPTION

Figure 1A:
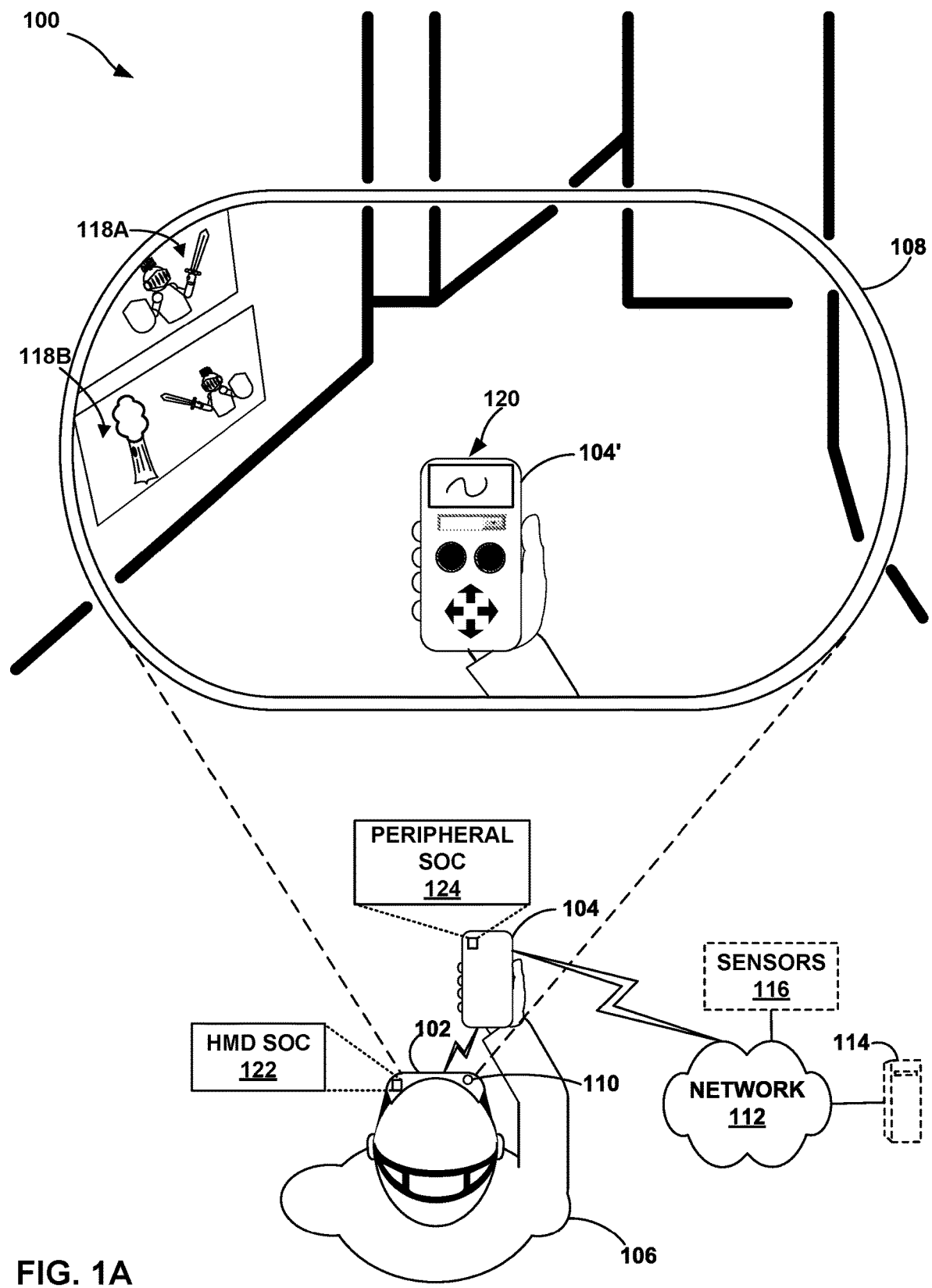
FIG. 1A is an illustration depicting an example multi-device artificial reality system that implements a wireless communication system providing improved security and data movement for wireless communication, in accordance with aspects of this disclosure.

Multi-device systems sometimes incorporate content protection or digital rights management technology, such as data encryption and decryption, as part of in-system, inter-device communications. A source device that originates an encrypted communication within the system may implement digital data encryption according to various standardized encryption mechanisms. A destination device that receives the encrypted communication for processing beyond simple relaying performs generally reciprocal or "inverse" steps with respect to the encryption mechanisms, in accordance with the inverse steps specified in the corresponding standard according to which the data was encrypted.

Encrypted inter-device communications are often performed in a packetized manner. The packetized communications are packaged as discrete data units (or "packets"), with each packet conforming to a format/structure. Packets of an inter-device encrypted data flow are referred to herein as "crypto packets." Each crypto packet conforms to a format in which an encrypted payload is encapsulated within an "encryption header." Various non-limiting examples of this disclosure are described with respect to peer-to-peer (P2P) unicast data flows between two devices of multi-device artificial reality systems.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Because the HMD and peripheral device communicate secure data (e.g., authentication data) with each other, the respective SoCs of the HMD and the peripheral device send data to one another in the form of crypto packets. To further enhance security when sending the crypto packets, the HMD may include a wireless communication system that may bifurcate the data movement and wireless transceiver control between an isolation microcontroller and a wireless microcontroller, which may improve the security of the wireless communication system by reducing, and in some cases eliminating, vulnerabilities of the engines and the isolation microcontroller to malformed packets received by the wireless transceivers and stored to wireless memory.

FIG. 1A is an illustration depicting a multi-device artificial reality system 100, components of which are configured to provide improved security and data movement for wireless communication. As further described below, an HMD 102 may include a wireless communication system having multiple microcontrollers to manage the transfer of data between shared memory that stores application data to be wirelessly transmitted and one or more wireless transceivers that stores packets headers, descriptors, and encrypted payloads for wireless receive and transmission operations.

Multi-device artificial reality system 100 includes head-mounted device (HMD) 102 and peripheral device 104. As shown, HMD 102 is typically worn by user 106, and includes an electronic display and optical assembly for presenting artificial reality content 108 to user 106. In addition, HMD 102 includes one or more sensors (e.g., accelerometers) for tracking motion of HMD 102. HMD 102 may include one or more image capture devices 110, e.g., cameras, line scanners, fundal photography hardware, or the like. Image capture devices 110 may be configured for capturing image data of the surrounding physical environment. In some examples, image capture devices 110 include inward-facing camera hardware and/or scanning hardware configured to capture facial images, retina scans, iris scans, etc. of user 106 for user authentication and for other purposes. HMD 102 is shown in this example as being in communication with (e.g., in wireless communication with or tethered to) peripheral device 104. Peripheral device 104 represents a co-processing device in communication with HMD 102. HMD 102 and/or peripheral device 104 may execute an artificial reality application to construct artificial reality content 108 for display to user 106. For example, HMD 102 and/or peripheral device 104 may construct the artificial reality content based on tracking pose information and computing pose information for a frame of reference, typically a viewing perspective of HMD 102.

As shown in FIG. 1A, one or more devices of multi-device artificial reality system 100 may be connected to a computing network, such as network 112. Network 112 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 112 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 100 or coupled to multi-device artificial reality system 100 via network 112. The optional nature of these devices is shown in FIG. 1A by way of dashed-line borders. One example of an optional device shown in FIG. 1A is console 114. In implementations that include console 114, console 114 may communicate with peripheral device 104 (and thereby, indirectly with HMD 102) to process artificial reality content that HMD 102 outputs to user 106. Another example of optional hardware shown in FIG. 1A is represented by external sensors 116. Multi-device artificial reality system 100 may use external sensors 116 and/or external camera hardware to capture three-dimensional (3D) information within the real-world, physical environment at which user 106 is positioned.

In general, multi-device artificial reality system 100 uses information captured from a real-world, 3D physical environment to render artificial reality content 108 for display to user 106. In the example of FIG. 1A, a user 106 views the artificial reality content 108 constructed and rendered by an artificial reality application executing on the combination of HMD 102 and peripheral device 104. In some examples, artificial reality content 108 may comprise a combination of real-world imagery (e.g., peripheral device 104 in the form of peripheral device representation 104', representations of walls at the physical environment at which user 106 is presently positioned, a representation of the hand with which user 106 holds peripheral device 104, etc.) overlaid with virtual objects (e.g., virtual content items 118A and 118B, virtual user interface 120, etc.) to produce an augmented reality experience or a mixed reality experience displayed to user 106 via display hardware of HMD 102.

In some examples, virtual content items 118A and 118B (collectively, virtual content items 118) may be mapped to a particular position within artificial reality content 108. As examples, virtual content items 118 may be pinned, locked, or placed to/at certain position(s) within artificial reality content 108. A position for a virtual content item may be fixed, as relative to one of the walls of the real-world imagery reproduced in artificial reality content 108, or to the earth, as examples. A position for a virtual content item may be variable, as relative to peripheral device representation 104' or to the tracked gaze or field of view (FoV) of user 106, as non-limiting examples. In some examples, the particular position of a virtual content item within artificial reality content 108 is associated with a position within the real-world, physical environment (e.g., on a surface of a physical object) at which user 106 is positioned presently.

In this example, peripheral device 104 is a physical, real-world device having a surface on which the artificial reality application executing on computing platforms of multi-device artificial reality system 100 overlays virtual user interface 120. Peripheral device 104 may include one or more presence-sensitive surfaces for detecting user inputs by detecting a presence of one or more objects (e.g., fingers, stylus) touching or hovering over locations of the presence-sensitive surface. In some examples, peripheral device 104 may include one or more output devices, such as a display integrated into the presence-sensitive surface to form an input/output (I/O) component of peripheral device 104.

In some examples, peripheral device 104 may have the form factor of various portable devices, such as a smartphone, a tablet computer, personal digital assistant (PDA), or other handheld device. In other examples, peripheral device 104 may have the form factor of various wearable devices, such as a so-called "smartwatch," "smart ring," or other wearable device. In some examples, peripheral device 104 may be part of a kiosk or other stationary or mobile system. While described above as integrating display hardware, peripheral device 104 need not include display hardware in all implementations.

In the example artificial reality experience shown in FIG. 1A, virtual content items 118 are mapped to positions on a visual representation of a wall of the real-world physical environment at which user 106 is positioned. The example in FIG. 1A also shows that virtual content items 118 partially appear on the visual representation of the wall only within artificial reality content 108, illustrating that virtual content items 118 do not represent any items that exist in the real-world, physical environment at which user 106 is positioned. Virtual user interface 120 is mapped to a surface of peripheral device 104 as represented in peripheral device representation 104'. Multi-device artificial reality system 100 renders virtual user interface 120 for display via HMD 102 as part of artificial reality content 108, at a user interface position that is locked relative to the position of a particular surface of peripheral device 104.

FIG. 1A shows that virtual user interface 120 appears overlaid on peripheral device representation 104' (and therefore, only within artificial reality content 108), illustrating that the virtual content represented in virtual user interface 120 does not exist in the real-world, physical environment at which user 106 is positioned. Multi-device artificial reality system 100 may render one or more virtual content items in response to a determination that at least a portion of the location of virtual content items is in the FoV of user 106. For example, multi-device artificial reality system 100 may render virtual user interface 120 on peripheral device 104 only if peripheral device 104 is within the FoV of user 106.

Various devices of multi-device artificial reality system 100 may operate in conjunction in the artificial reality environment, such that each device may be a separate physical electronic device and/or separate integrated circuits within one or more physical devices. In this example, peripheral device 104 is operationally paired with HMD 102 to jointly operate to provide an artificial reality experience. For example, peripheral device 104 and HMD 102 may communicate with each other as co-processing devices. As one example, when a user performs a user interface-triggering gesture in the virtual environment at a location that corresponds to one of the virtual user interface elements of virtual user interface 120 overlaid on peripheral device representation 104', multi-device artificial reality system 100 detects the user interface and performs an action that is rendered and displayed via HMD 102.

Each of peripheral device 104 and HMD 102 may include one or more SoC integrated circuits configured to support aspects of the artificial reality application described above, such as SoCs operating as co-application processors, encryption engines, decryption engines, sensor aggregators, display controllers, etc. Although each of peripheral device 104 and HMD 102 may include multiple SoCs, FIG. 1A only illustrates HMD SoC 122 of HMD 102 and peripheral SoC 124 of peripheral device 104, for ease of illustration and discussion. To preserve security and digital rights, HMD SoC 122 and peripheral SoC 124 are configured to communicate with one another using encrypted data streams, such as by sending crypto packet flows over a wireless link formed using respective peripheral component interface (PCI) express (PCIe) buses of HMD SoC 122 of HMD 102 and peripheral SoC 124. As just one example, HMD SoC 122 may encrypt facial images, retina scans, iris scans, etc. of user 106 (e.g., as captured by inward-facing camera hardware and/or fundal photography hardware of image capture devices 110), and send the encrypted data to peripheral SoC 124 for authentication purposes and optionally, for other purposes as well. In this example, peripheral SoC 124 may decrypt the encrypted data received from HMD SoC 122, and process the decrypted data using facial recognition technology, retinal blood vessel pattern recognition technology, etc. to grant/deny biometric authentication to user 106.

HMD SoC 122 and peripheral SoC 124 are described herein as performing encryption and decryption operations that comply with the standardized encryption and decryption mechanisms described in the advanced encryption standard (AES) established by the United States National Institute of Standards and Technology (NIST) as a non-limiting example. It will be appreciated that HMD SoC 122 and peripheral SoC 124 may, in other examples, implement the traffic constraint-based enhancements of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc.

As described herein, HMD 102 may include a wireless communication system that improves the performance of encryption and decryption operations when sending or receiving encrypted packets from HMD SoC 122 to peripheral SoC 124.

In this example, each of HMD SoC 122 and peripheral SoC 124 includes multiple subsystems, with each subsystem being dedicated to supporting certain functionalities, such as audio processing for the artificial reality experience, moving picture processing for the artificial reality experience, security information for user 106 or others, etc. Additionally, HMD SoC 122 and peripheral SoC 124 implements a shared memory (SMEM) that stores data for all of the respective subsystems of that particular SoC. The various subsystems of HMD SoC 122 are configured to be mutually distrusting, and the various subsystems of peripheral SoC 124 are configured to be mutually distrusting, with respect to SMEM access. As such, each of HMD SoC 122 and peripheral SoC 124 are configured to limit access to discrete address spaces of their respective SMEM units to a specific, single subsystem.

In this example, HMD 102 may include a wireless communication system that comprises a first microcontroller (the "wireless microcontroller") that manages drivers for the wireless transceivers of HMD 102 and orchestrates data movement between the I/O ports associated with the wireless transceivers and first physical memory (the "wireless memory"). The wireless memory may store packets headers, descriptors, and encrypted payloads for wireless receive and transmission operations. Peripheral device 104 may include a similar wireless communication system. The wireless communication systems of HMD 102 and peripheral device 104 facilitate wireless communication between HMD 102 and peripheral device 104. More particularly, HMD SoC 122 may include the wireless communication system of HMD 102 and peripheral SoC 124 may include the wireless communication system of peripheral device 104.

In some examples, the wireless communication system includes a second microcontroller (the "isolation microcontroller", not shown in FIG. 1A) that communicates with other engines of the wireless communication system that generate application data to be wirelessly transmitted, which the other engines store to shared memory. Shared memory may be physically isolated, e.g., a different memory device, from the wireless memory. The isolation microcontroller creates packets and corresponding packet headers from the application data, and the isolation microcontroller orchestrates data movement between the shared memory and the wireless memory. In this way, access to shared memory by a microcontroller or other processing circuitry that is processing received wireless packets is mediated by the isolation microcontroller.

In some cases, the wireless microcontroller executes the full set of one or more drivers for the wireless transceivers, but the isolation microcontroller may execute a more limited code to orchestrate data movement and manage packetization. In addition, only the wireless microcontroller may have access to the wireless memory. Because malformed packets may be used to exploit vulnerabilities of the drivers executed by the wireless microcontroller, bifurcating the data movement and wireless transceiver control between the isolation microcontroller and the wireless microcontroller may improve the security of the wireless communication system by reducing, and in some cases eliminating, vulnerabilities of the engines and the isolation microcontroller to malformed packets received by the wireless transceivers and stored to wireless memory.

In some cases, the wireless communication system includes an inline encryption/decryption engine (not shown in FIG. 1A) to encrypt and decrypt packets on a data path, managed by the isolation microcontroller, between the shared memory and the wireless transceivers. For example, the isolation microcontroller creates encryption headers in the wireless memory for packets to be formed from application data generated by other engines of a device that includes the wireless communication system. The isolation microcontroller may program a direct memory access (DMA) controller to direct the packets from shared memory along with corresponding packet headers from wireless memory to the encryption/decryption engine, which generates encrypted packets that the programmed DMA controller writes to wireless memory. That is, the isolation microcontroller communicates with internal engines that generate application data for wireless transmission, creates headers and packets from the application data in the shared memory, and orchestrates data movement between the shared memory and the wireless memory using the DMA controller. The isolation microcontroller also manages the data path for encrypted packets received by the wireless communication system to ensure inline decryption by the encryption/decryption engine. The wireless microcontroller, which executes the drivers for the wireless transceiver, signals the isolation microcontroller indicating new received, encrypted packets. In response, the isolation microcontroller may program the DMA controller to direct received, encrypted packets from the wireless memory to the encryption/decryption engine, which decrypts the packets with headers from the encrypted packets, and the programmed DMA controller writes the packet data to application payload destination memory allocated in the shared memory. In this way, the application payload is stored to shared memory of a destination device in the same image as the application payload was in the shared memory of the sender device.

In some cases, the encryption/decryption engine for the wireless communication system increments an encryption packet counter for every packet encrypted by the engine. The packet counter value is then transmitted in the header along with the packet. On the receiver side, the counterpart encryption/decryption engine reads the packet counter from the header and initializes local decryption using a local copy of the nonce and the received packet counter. In this way, each packet can be decrypted individually, and a loss of a packet has no impact on future or past packets.

FIG. 1B is an illustration depicting another example multi-device artificial reality system 126 that includes a wireless communication system providing improved security and data movement for wireless communication, in accordance with the techniques described in this disclosure. Similar to multi-device artificial reality system 100 of FIG. 1A, HMD SoC 122 may include a wireless communication system having multiple microcontrollers to manage the transfer of data between shared memory that stores application data to be wirelessly transmitted and one or more wireless transceivers that stores packets headers, descriptors, and encrypted payloads for wireless receive and transmission operations.

In the example of FIG. 1B, multi-device artificial reality system 126 includes external cameras 128A and 128B (collectively, "external cameras 128"), HMDs 102A-102C (collectively, "HMDs 102"), console 114, and sensors 116. As shown in FIG. 1B, multi-device artificial reality system 126 represents a multi-user environment in which an artificial reality application executing on console 114 and/or HMDs 102 presents artificial reality content to each of users 106A-106C (collectively, "users 106") based on a current viewing perspective of a corresponding frame of reference for the respective user 106. That is, in this example, the artificial reality application constructs artificial reality content by tracking and computing pose information for a frame of reference for each of HMDs 102. Multi-device artificial reality system 126 uses data received from external cameras 128 and/or HMDs 102 to capture 3D information within the real-world environment, such as motion by users 106 and/or tracking information with respect to users 106, for use in computing updated pose information for a corresponding frame of reference of HMDs 102.

HMDs 102 operate concurrently within multi-device artificial reality system 126. In the example of FIG. 1B, any of users 106 may be a "player" or "participant" in the artificial reality application, and any of users 106 may be a "spectator" or "observer" in the artificial reality application. HMDs 102 of FIG. 1B may each operate in a substantially similar way to HMD 102 of FIG. 1A. For example, HMD 102A may operate substantially similar to HMD 102 of FIG. 1A, and may receive user inputs by tracking movements of the hands of user 106A.

Each of HMDs 102 implements a respective user-facing artificial reality platform (or co-implements the platform with a co-processing device, as in the case of HMD 102A with peripheral device 104), and outputs respective artificial content, although only artificial reality content 108 output by HMD 102A is shown in FIG. 1B, purely for the purpose of ease of illustration. As shown in FIG. 1B, two or more of HMDs 102 may, but need not necessarily, conform to the same form factor. Various form factors of HMDs 102 are shown in FIG. 1B, including a goggle form factor and an eyeglass form factor. In some use case scenarios, HMDs 102B and/or 102C may also be paired (e.g. wirelessly coupled or tethered to) a portable device that implements generally corresponding features to those described with respect to peripheral device 104.

Similar to the example described in FIG. 1A, HMD 102C (or any of HMDs 102) may include a wireless communication system that improves the performance of encryption and decryption operations when sending or receiving encrypted packets from HMD SoC 122 to peripheral SoC 124.

In this example, each of HMD SoC 122 and peripheral SoC 124 includes multiple subsystems, with each subsystem being dedicated to supporting certain functionalities, such as audio processing for the artificial reality experience, moving picture processing for the artificial reality experience, security information for user 106 or others, etc. Additionally, HMD SoC 122 and peripheral SoC 124 implements a shared memory (SMEM) that stores data for respective subsystems of that particular SoC. The various subsystems of HMD SoC 122 are configured to be mutually distrusting, and the various subsystems of peripheral SoC 124 are configured to be mutually distrusting, with respect to SMEM access. As such, each of HMD SoC 122 and peripheral SoC 124 are configured to limit access to discrete address spaces of their respective SMEM units to a specific, single subsystem.

In this example, HMD 102C may include a wireless communication system as described elsewhere herein. In addition, peripheral device 104 may include a wireless communication system as described elsewhere herein. More particularly, HMD SoC 122 may include the wireless communication system of HMD 102 and peripheral SoC 124 may include the wireless communication system of peripheral device 104.

Figure 2:
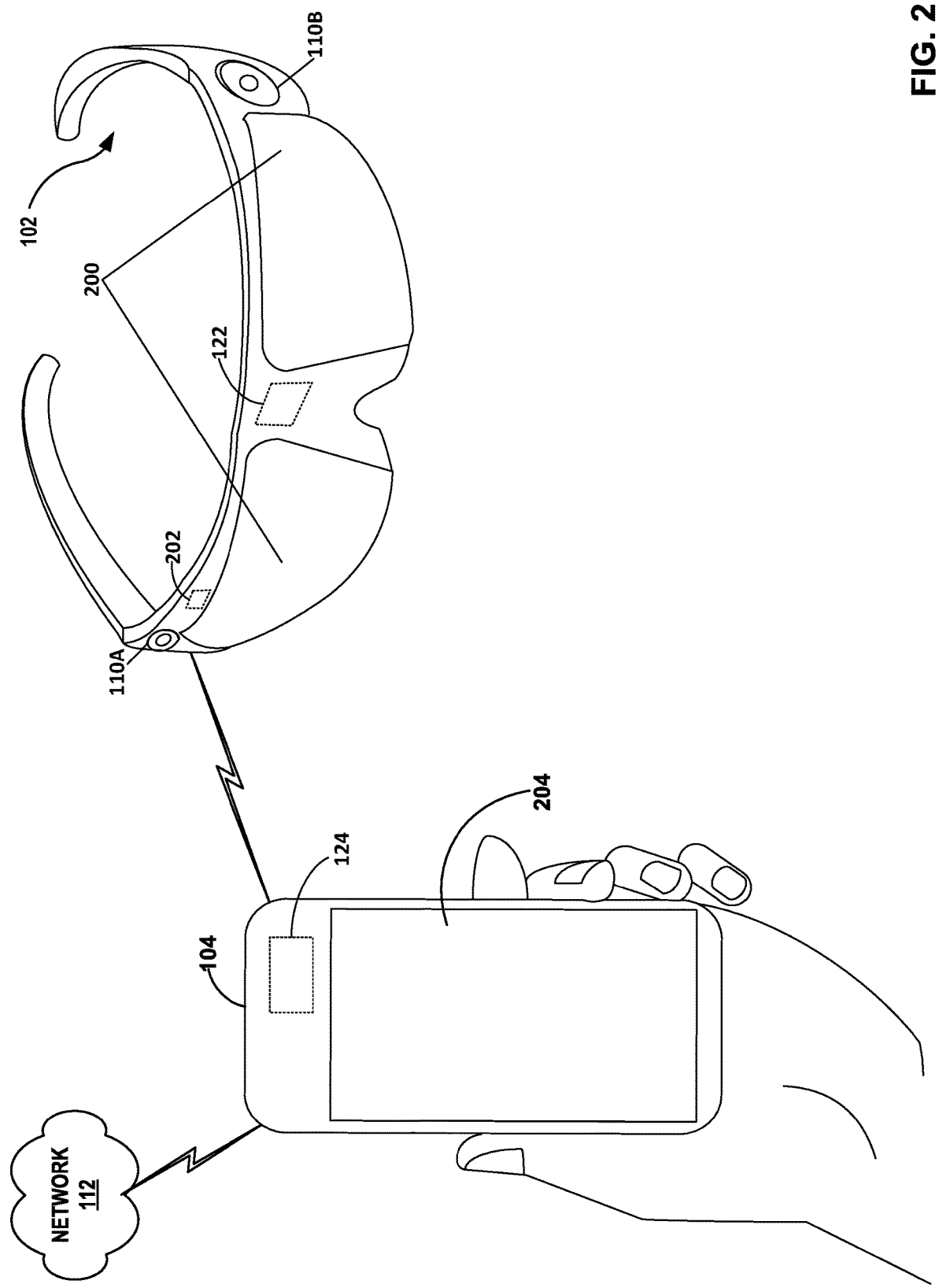
FIG. 2 is an illustration depicting an example HMD configured to provide improved security and data movement for wireless communication, in accordance with the techniques of the disclosure.

FIG. 2 is an illustration depicting an example of HMD 102 in communication with peripheral device 104 according to the data communication aspects of the disclosure. HMD 102 of FIG. 2 may be an example of any of HMDs 102 of FIGS. 1A and 1B. In some examples, HMD 102 and peripheral device 104 may be part of an artificial reality system that incorporates other devices and network intermediaries, such as in the examples of artificial reality systems 100 and 126 illustrated in FIGS. 1A and 1B. In other examples, HMD 102 and peripheral device 104 may operate as a tandem, mobile artificial realty system configured to implement the DMA-resistant data communication techniques described herein.

In this example, HMD 102 includes a front rigid body and two stems to secure HMD 102 to user 106 e.g., by resting over the ears of user 106. In addition, HMD 102 includes an interior-facing electronic display 200 configured to present artificial reality content to user 106. Electronic display 200 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, electronic display 200 includes a stereoscopic display for providing separate images to each eye of user 106. In some examples, the known orientation and position of display 200 relative to the front rigid body of HMD 102 is used as a frame of reference, also referred to as a local origin, when tracking the position and orientation of HMD 102 for rendering artificial reality content according to a current viewing perspective of HMD 102 and user 106.

HMD 102 takes the form factor of eyeglasses in the example of FIG. 2. In some examples, electronic display 200 may be split into multiple segments, such as into two segments, with each segment corresponding to a separate lens disposed on the rigid front body of HMD 102. In other examples in accordance with FIG. 2, electronic display 200 may form a contiguous surface that spans both lenses and the lens-connecting bridge (i.e., the over-the-nose portion) of the rigid front body of HMD 102. In some examples in accordance with the form factor illustrated in FIG. 2, electronic display 200 may also encompass portions of HMD 102 that connect the lenses of the front rigid body to the stems, or optionally, portions of the stems themselves. These various designs of electronic display 200 in the context of the form factor of HMD 102 shown in FIG. 2 improve accessibility for users having different visual capabilities, eye movement idiosyncrasies, etc. In other examples, HMD 102 may take other form factors, such as the general form factor of a headset or goggles equipped with a band to secure HMD 102 to the head of user 106.

In the example illustrated in FIG. 2, HMD 102 further includes one or more motion sensors 202, such as one or more accelerometers (also referred to as inertial measurement units or "IMUs") that output data indicative of current acceleration of HMD 102, GPS sensors that output data indicative of a location of HMD 102, radar, or sonar that output data indicative of distances of HMD 102 from various objects, or other sensors that provide indications of a location or orientation of HMD 102 or other objects within a physical environment. In the example illustrated in FIG. 2, HMD 102 includes integrated image capture devices 110A and 110B (collectively, "image capture devices 110"). Image capture devices 110 may include still image camera hardware, video camera hardware, laser scanners, Doppler® radar scanners, fundus photography hardware, infrared imaging cameras, depth scanners, or the like. Image capture devices 110 may include outward-facing and/or inward-facing image capture hardware, and include any hardware configured to capture image data representative of a surrounding physical environment, and optionally, to preprocess and/or post process the captured image data. Outward-facing camera hardware of image capture devices 110 may capture image data of the physical environment outside of HMD 102, such as, but not limited to, the real-world environment at which user 106 is positioned. Inward-facing camera hardware of image capture devices 110 may capture image data of wearer of HMD 102, such as facial images and/or retina scans and/or temperature information of user 106.

Again HMD 102 is in communication example peripheral device 104 in the example of FIG. 2. Peripheral device 104 may be communicatively coupled to HMD 102 in a number of ways, such as over a wireless communication links (e.g., Wi-Fi™, near-field communication of short-range wireless communication such as Bluetooth®, etc.) or a wired communication link or tethered connection, or any combination thereof. Peripheral device 104 may receive and send data over network 112, and may thereby function as a network interface of the artificial reality system that includes or is formed by the combination peripheral device 104 with HMD 102. Surface 204 of peripheral device 104 represents an input component or a combined input/output component of peripheral device 104. Surface 204 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 204 may enable peripheral device 104 to receive touch input or gesture input without direct contact with surface 204. User 106 may provide these touch or gesture inputs to peripheral device 104 to provide instructions directly to peripheral device 104, or indirectly to HMD 102 and/or other components of an artificial reality system in which HMD 102 is deployed. In some examples, processing circuitry of HMD 102 may utilize image capture devices 110 to analyze configurations, positions, movements, and/or orientations of peripheral device 104, of the hand(s) or digit(s) thereof of user 106 to enable to provide input using gestures such as drawing gestures or typing gestures provided via a graphical keyboard.

In this way, peripheral device 104 may offload various hardware and resource burdens from HMD 102, which enables low-profile form factor designs of HMD 102. Peripheral device 104 also serves as a communications intermediary between HMD 102 and devices at remote locations, via network 112. Additional details of peripheral device 104 are described in U.S. patent application Ser. No. 16/506,618 (filed on 9 Jul. 2019), the entire content of which is incorporated herein by reference. HMD 102 includes HMD SoC 122, and peripheral device 104 includes peripheral SoC 124. HMD SoC 122 and peripheral SoC 124 are communicatively coupled over the communicative connection between HMD 102 and peripheral device 104. The remainder of this disclosure describes the communications between HMD SoC 122 and peripheral SoC 124 as being performed over a wireless link between HMD 102 and peripheral device 104, although it will be understood that HMD 102 and peripheral device 104 may be coupled via other types of communicative connections, as well.

Figure 3:
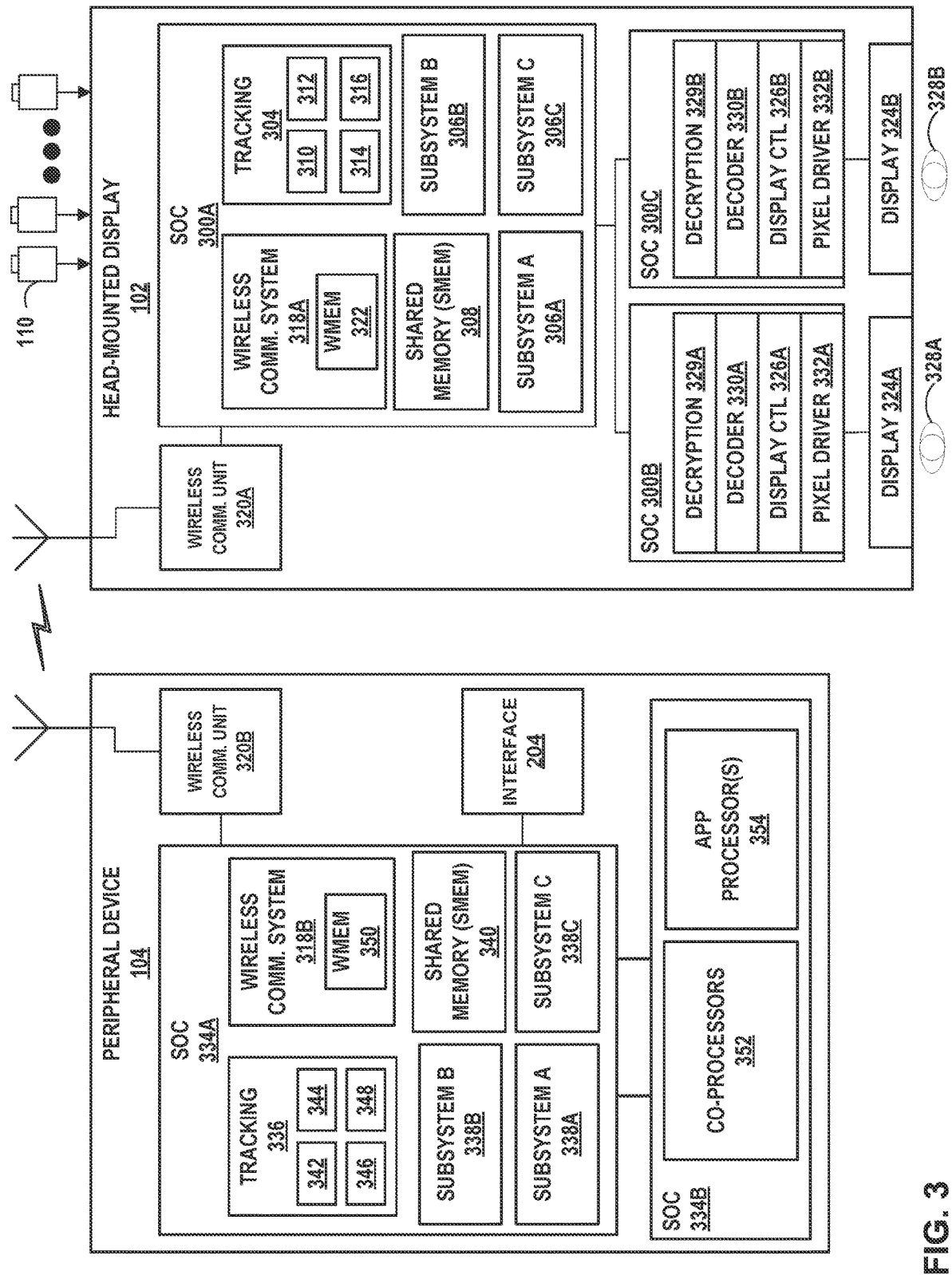
FIG. 3 is a block diagram illustrating an example implementation of a distributed architecture for a multi-device artificial reality system in which one or more devices are implemented using one or more system on a chip (SoC) integrated circuits within each device and having wireless communication systems according to techniques of this disclosure.

FIG. 3 is a block diagram illustrating a more detailed example implementation of a distributed architecture for a portion of multi-device artificial reality systems 100 or 126, in which two or more devices are implemented using respective SoC integrated circuits within each device. FIG. 3 illustrates an example in which HMD 102 operating in conjunction with peripheral device 104. Again, peripheral device 104 represents a physical, real-world device having a surface on which multi-device artificial reality systems 100 or 126 overlay virtual content. Peripheral device 104 may include one or more presence-sensitive surface(s) 204 for detecting user inputs by detecting a presence of one or more objects (e.g., fingers, stylus, etc.) touching or hovering over locations of presence-sensitive surfaces) 204. In some examples, peripheral device 104 may have a form factor similar to any of a smartphone, a tablet computer, a personal digital assistant (PDA), or other hand-held device. In other examples, peripheral device 104 may have the form factor of a smartwatch, a so-called "smart ring," or other wearable device. Peripheral device 104 may also be part of a kiosk or other stationary or mobile system. Presence-sensitive surface(s) 204 may incorporate output components, such as display device(s) for outputting visual content to a screen. As described above, HMD 102 is architected and configured to enable the execution of artificial reality applications.

In general, the SoCs illustrated in FIG. 3 represent a collection of specialized integrated circuits arranged in a distributed architecture, where each SoC integrated circuit includes various specialized functional blocks configured to provide an operating environment for artificial reality applications. FIG. 3 is merely one example arrangement of SoC integrated circuits. The distributed architecture for a multi-device artificial reality system may include any collection and/or arrangement of SoC integrated circuits.

In this example, SoC 300A of HMD 102 comprises functional blocks including tracking subsystems 304, and various other subsystems 306A-306C. The subsystems 304 and 306A-306C are groups of integrated circuits that provide one or more defined functions to the SoC 300A. SoC 300A may be an example instance of HMD SoC 122. In some examples, the subsystems 304 and 306A-306C are configured such that the integrated circuits within a subsystem may, for example, be powered on and off together. Additionally, in some examples, the subsystems 304 and 306A-306C may each be communicatively coupled to shared memory (SMEM) 308 through a data bus (sometimes referred to as a "Network-on-a-Chip" or "NoC"). In some examples, subsystems 304 and 306A-306C may communicate using inter processor communication (IPC) (e.g., mailbox-based IPC, etc.).

In the illustrated example, tracking subsystems 304 provides functional blocks for eye tracking 310, hand tracking 312, depth tracking 314, and/or Simultaneous Localization and Mapping (SLAM) 316. For example, HMD 102 may receive input from one or more accelerometers (also referred to as inertial measurement units or "IMUs") that output data indicative of current acceleration of HMD 102, GPS sensors that output data indicative of a location of HMD 102, radar or sonar that output data indicative of distances of HMD 102 from various objects, or other sensors that provide indications of a location or orientation of HMD 102 or other objects within a physical environment. HMD 102 may also receive image data from one or more image capture devices 110. Image capture devices 110 may include video cameras, laser scanners, Doppler radar scanners, depth scanners, or the like, configured to output image data representative of the physical environment. More specifically, image capture devices capture image data representative of objects (including peripheral device 104 and/or hand) in the physical environment that are within a field of view of image capture devices, which typically corresponds with the viewing perspective of HMD 102. Based on the sensed data and/or image data, tracking subsystem 304 determines, for example, a current pose for the frame of reference of HMD 102 and, in accordance with the current pose, renders the artificial reality content.

Subsystems 306A-306C provide specialized functions for HMD 102. Subsystems 306A-306C may include, for example, security processing, graphics processing, an interface processing, audio processing, and/or display processing, etc. Security processing subsystem may provide secure device attestation and mutual authentication of when pairing peripheral device 104 with devices, e.g., HMD 102, used in conjunction within the AR environment. For example, a security processing subsystem may authenticate one or more of the SoCs of peripheral device 104. A graphics processing subsystem may include various processors such as a video processing unit, graphics processing unit, digital signal processors, encoders and/or decoders, etc. to process surface and texture data received from the peripheral device 104. An interface processing subsystem may, for example, process signals generated by the tracking subsystem 304 and/or the image capture device 110 to provide gesture recognition to provide a gesture-based interface to the user 106. An audio processing subsystem may, for example, include codecs and/or drivers to process and output sound to audio output devices incorporated in HMD 102. A display processing subsystem may, for example, provide an interface for communicating texture and surface data between SoCs of HMD 102. When subsystems 304 and 306A-306C have data to transmit to peripheral device 104, the subsystems 304 and 306A-306C may (a) create an application payload with an application header to enable the destination to unpack and use the payload, (b) place the application payload with the application header in shared memory 308, and (c) signal wireless communication system 318A that application payload with an application header are ready to be transmitted.

SoC 300A includes wireless communication system 318A. Wireless communication system 318A is responsible for connecting and managing the interfaces external to the system. Wireless communication system 318A provides an abstraction between the peripheral interfaces and other subsystems, using the concept of a software channel. Once a channel is established, any message/payload on this channel is delivered by wireless communication system 318A to a counterpart wireless communication system (e.g., wireless communication system 318B) of another device (e.g., the peripheral device 104) with minimal overhead. As described below in FIGS. 4 and 5A-5E, wireless communication system 318A sends and receives data via wireless communication unit 320A. Wireless communication system 318A orchestrates data movement between I/O ports associated with wireless transceivers of wireless communication unit 320A and SMEM 308. In particular, wireless communication system 318A separates, between different processors, (i) orchestrating data between SMEM 308 and internal wireless memory (WMEM) 322 and (ii) and driving wireless communication unit 320A to orchestrate data between the I/O ports associated with wireless transceivers and WMEM 322. Additionally or alternatively, wireless communication system 318A encrypt data from SMEM 308 before the data enters WMEM in a manner that each data packet may be separately validated at its destination to determine whether the packet has been tampered with. These techniques, individually and in combination, reduce the likelihood that a compromise of the drivers of the wireless communication unit 320A can compromise the data in SMEM 308.

SoCs 300B and 300C (sometimes referred to as the "display SoCs") each represents display controllers for outputting artificial reality content on respective displays, e.g., displays 324A and 324B (collectively, "displays 324"). In this example, display SoC 300B may include a display controller 326A for display 324A to output artificial reality content for a left eye 328A of a user (e.g., user 106 of FIGS. 1A and 1B). For example, display SoC 300B includes a decryption block 329A, a decoder block 330A, and/or a pixel driver 332A for outputting artificial reality content on display 324A. Similarly, display SoC 300C may include a display controller 326B for display 324B to output artificial reality content for a right eye 328B of the user. For example, display SoC 300C includes a decryption block 329B, a decoder block 330B, and/or a pixel driver 332B for generating and outputting artificial reality content on display 324B. Displays 324 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 104 includes SoCs 334A and 334B configured to support an artificial reality application. In this example, SoC 334A comprises functional blocks including tracking subsystem 336, and various other subsystems 338A-338C. The subsystems 336 and 338A-338C are groups of integrated circuits that provide one or more defined functions to the SoC 334A. SoC 334A may be an example instance of peripheral SoC 124. In some examples, the subsystems 336 and 338A-338C are configured such that the integrated circuits within a subsystem may, for example, be powered on and off together. Additionally, in some examples, the subsystems 336 and 338A-338C may each be communicatively coupled to shared memory (SMEM) 340 through a database (sometimes referred to as a "Network-on-a-Chip" or "NoC"). In some examples, subsystems 336 and 338A-338C may communicate using inter processor communication (IPC) (e.g., mailbox-based IPC, etc.).

Tracking subsystem 336 is a functional block providing eye tracking 342, hand tracking 344, depth tracking 346, and/or Simultaneous Localization and Mapping (SLAM) 348. For example, peripheral device 104 may receive input from one or more accelerometers (also referred to as inertial measurement units or "IMUs") that output data indicative of current acceleration of peripheral device 104, GPS sensors that output data indicative of a location of peripheral device 104, radar or sonar that output data indicative of distances of peripheral device 104 from various objects, or other sensors that provide indications of a location or orientation of peripheral device 104 or other objects within a physical environment. Peripheral device 104 may in some examples also receive image data from one or more image capture devices, such as video cameras, laser scanners, Doppler radar scanners, depth scanners, or the like, configured to output image data representative of the physical environment. Based on the sensed data and/or image data, tracking subsystem 336 determines, for example, a current pose for the frame of reference of peripheral device 104 and, in accordance with the current pose, renders the artificial reality content to HMD 102.

Subsystems 338A-338C provide specialized functions for peripheral device 104. Subsystems 338A-338C may include, for example, a security processing subsystem, a display subsystem, a graphics subsystem, and/or an audio subsystem. A security processing subsystem may authenticate one or more of the SoCs of HMD 102. A graphics processing subsystem may include various processors such as a video processing unit, graphics processing unit, digital signal processors, encoders and/or decoders, etc. to process surface and texture data received from SoC 334B. An interface processing subsystem may, for example, process signals generated by the tracking subsystem 336 and/or the interface 204 to an interface 120 to the user 106. An audio processing subsystem may, for example, include digital signal processors, encoders and/or decoders, etc. to process sound to be transmitted to HMD 102. A display processing subsystem may, for example, provide an interface for communicating texture and surface data between SoCs of peripheral device 104. When subsystems 336 and 338A-338C have data to transmit to HMD 102, the subsystems 336 and 338A-338C may (a) create an application payload with an application header to enable the destination to unpack and use the payload, (b) place the application payload with the application header in shared memory 340, and (c) signal wireless communication system 318B that application payload with an application header are ready to be transmitted.

SoC 334A includes wireless communication system 318B. As described below in FIGS. 4 and 5A-5E, wireless communication system 318B sends and receives data via wireless communication unit 320B. Wireless communication system 318B orchestrates data movement between I/O ports associated with wireless transceivers of wireless communication unit 320B and SMEM 340. In particular, wireless communication system 318B separates, between different processors, (i) orchestrating data between SMEM 340 and internal wireless memory (WMEM) 350 and (ii) and driving wireless communication unit 320B to orchestrate data between the I/O ports associated with wireless transceivers and WMEM 350. Additionally or alternatively, wireless communication system 318B encrypt data from SMEM 340 before the data enters WMEM 350 in a manner that each data packet may be separately validated at its destination to determine whether the packet has been tampered with. These techniques, individually and in combination, reduce the likelihood that a compromise of the drivers of the wireless communication unit 320B can compromise the data in SMEM 340.

SoC 334B includes one or more application co-processors 352 and one or more application processors 354. In this example, co-application processors 352 includes various processors, such as a vision processing unit (VPU), a graphics processing unit (GPU), and/or central processing unit (CPU). Application processors 354 may include a processing unit for executing one or more artificial reality applications to generate and render, for example, a virtual user interface to a surface of peripheral device 104 and/or to detect gestures performed by a user with respect to peripheral device 104.

Figure 4:
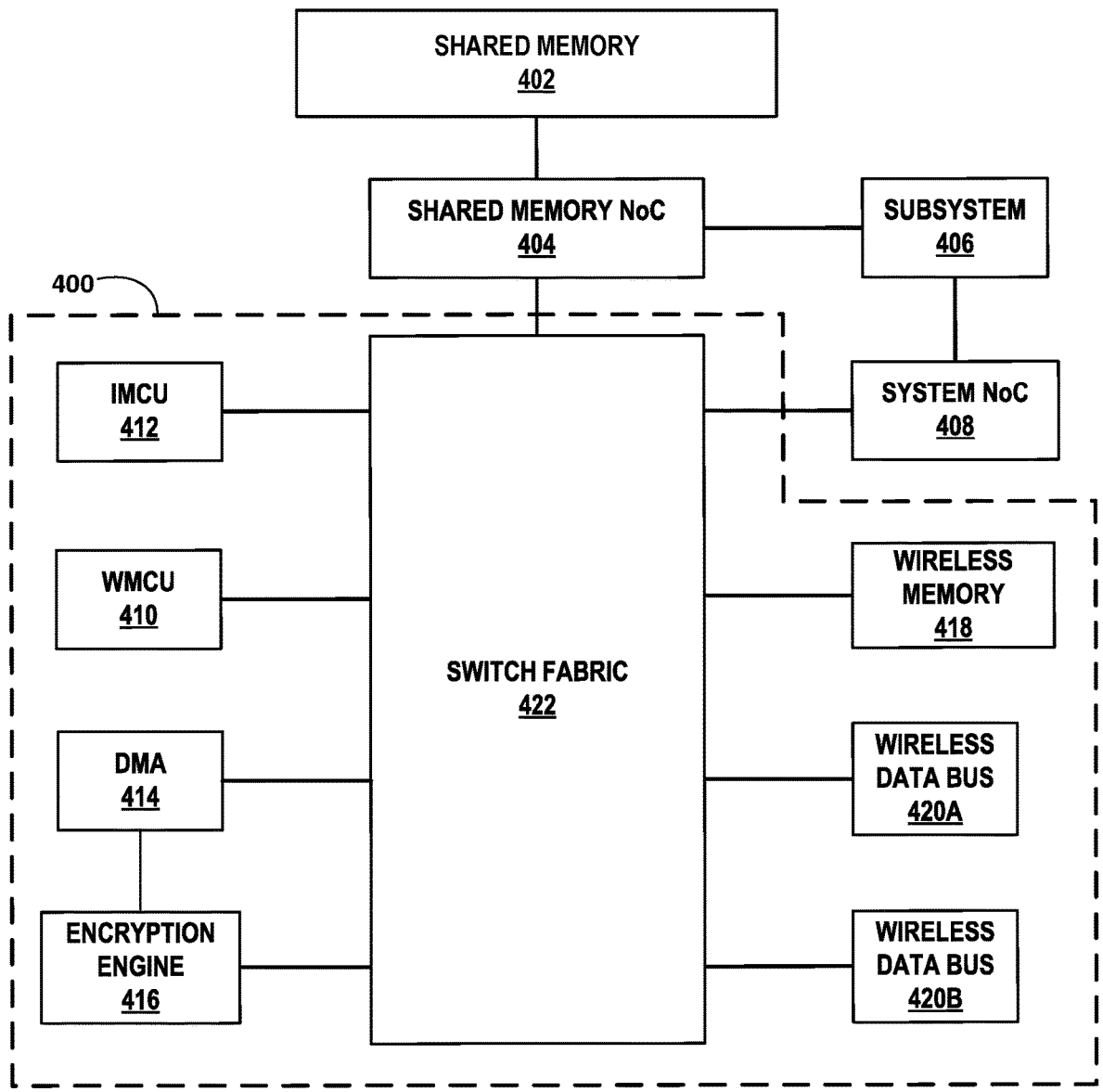
FIG. 4 is a block diagram illustrating a wireless communication system, in accordance with the techniques of the disclosure.

FIG. 4 is a block diagram illustrating a wireless communication system 400, in accordance with the techniques of the disclosure. Wireless communication system 400 may be an example of wireless communication systems 318A and 318B of FIG. 3. Wireless communication system 400 is communicatively coupled to shared memory (SMEM) 402 via a shared memory network-on-a-chip (NoC) 404. Shared memory 402 may be an example of shared memory 308 and 340 of FIG. 3. One or more subsystems 406 are communicatively coupled to shared memory 402 via shared memory NoC 404. Additionally, one or more subsystems 406 are communicatively coupled to wireless communication system 400 via system NoC 408. Shared memory NoC 404 and system NoC 408 may support bus protocols including Advanced eXtensible Interface (AXI), Advanced Peripheral Bus (APB), Open Core Protocol (OCP), and TileLink (TL). Subsystems 406 may be examples of subsystems 306A-306C and 338A-338C of FIG. 3.

In the example of FIG. 4, wireless communication system 400 includes a wireless microcontroller (WMCU) 410, isolation microcontroller (IMCU) 412, a direct memory access (DMA) controller 414, an encryption engine 416, wireless memory (WMEM) 418, one or more wireless data bus interfaces 420A and 420B, and, in some examples, switch fabric 422 (sometimes referred to as a "crossbar switch"). In some examples, wireless communication system 400 may include a wired data bus that may be used when, for example, wireless communication unit 320A and 320B are not available.

Wireless microcontroller 410 manages drivers (e.g., wireless base band drivers) or the wireless transceivers of wireless communication unit 320A and 320B connected to wireless data bus interfaces 420A and 420B. As described below, wireless microcontroller 410 orchestrates data movement between the I/O ports associated with the wireless transceivers and wireless memory 418. For example, wireless microcontroller 410 may generate a descriptor table for wireless data bus interfaces 420A and 420B, and sends a pointer to the table in wireless memory 418 to wireless data bus interfaces 420A and 420B. Wireless microcontroller 410 has access to wireless memory 418 but does not have access to shared memory 402. Wireless microcontroller 410 is isolated from shared memory 402 such that wireless microcontroller 410 does not have direct access (e.g., cannot retrieve data from) shared memory 402.

Isolation microcontroller 412 provides isolation between wireless microcontroller 410 and shared memory 402. Isolation microcontroller 412 communicates with subsystems 406 that generate application data to be wirelessly transmitted, which the other subsystems 406 store to shared memory 402. Isolation microcontroller 412 may receive a message (e.g., inter-process communication (IPC) message) from the application that includes, for example, a source-destination id and pointers to application payload and headers (collectively referred to as "application data"). Isolation microcontroller 412 determines a number of packets the application payload may be split into based on a transmission packet size. Isolation microcontroller 412 defines boundaries of the packets from the application data. For example, isolation microcontroller 412 may create a list of starting addresses that correspond to the starting location of each packet in shared memory 402. Isolation microcontroller 412 then creates corresponding packet headers (sometimes referred to as "transmission headers") to store in wireless memory 418. The transmission headers include parameters of the application data and the packet (e.g., length of the packets in 128-bit blocks, the packet number, etc.), as well as an empty encryption block. As described below, isolation microcontroller 412 orchestrates data movement between shared memory 402 and the wireless memory 418. Isolation microcontroller 412 programs DMA controller 414 to create packets (sometimes referred to as "transmission packets") to store in wireless memory 418 to be transmitted by the wireless communication unit 320A and 320B via wireless data bus interfaces 420A and 420B.

Wireless communication system 400 may include a doorbell register for IPC between wireless microcontroller 410 and isolation microcontroller 412. For example, when ingress packets are stored in wireless memory 418 (e.g., packets received from wireless database interfaces 420A and 420B), wireless microcontroller 410 may write data in the doorbell register to notify isolation microcontroller 410 that the data in wireless memory 418 is available to be processed. As another example, then transmission packets are stored in wireless memory 418, isolation microcontroller 412 may write data in the doorbell register to notify wireless microcontroller 410 that transmission packets are ready to be transmitted. By writing in the doorbell register, an interrupt is triggered to the target processor to indicate the data is available to process.

In this way, access to shared memory by a microcontroller or other processing circuitry that is processing received wireless packets is mediated by isolation microcontroller 412. In some cases, wireless microcontroller 410 executes the full set of one or more drivers for the wireless transceivers, but the isolation microcontroller 412 may execute a more limited code to orchestrate data movement and manage packetization.

To program DMA controller 414, isolation microcontroller 412 provides address of the packets in shared memory 402 and the address in wireless memory 418 of the partially filled transmission headers. DMA controller 414 pulls the partially filled transmission headers from wireless memory 418 and the actual application data packet from shared memory 402 to combine and store in wireless memory 418. Encryption engine 416 encrypts the data inline as the data traverses from shared memory 402 to wireless memory 418. Encryption engine 416 modifies the partially filled transmission headers by inserting into the empty encryption block an initial vector (sometimes referred to as an "encryption vector") to facilitate a receiving engine in decrypting the packet. In some examples, encryption engine 416 is a multi-context encryption/decryption engine. In some such examples, encryption engine 416 is an unrolled AES-128 encryption engine with eight selectable keys and an inline header parser to select the key and encryption mode. Encryption engine 416 is an extension of the DMA master channel as presented to switch fabric 422. From the data-flow point of view, encryption engine 416 adds a few clock cycles to the DMA latency while encrypting the data as it goes through the engine.

Wireless memory 418 may be physically isolated, e.g., a different memory device, from wireless shared memory 402. Wireless memory 418 may include SRAM or other types of memory having a data interface and power-gate and deep sleep power support.

Wireless data bus interfaces 420A and 420B may include peripheral component interconnect express (PCIe) slots. Wireless data bus interfaces 420A and 420B may pull transmission packets from wireless memory 418 based on the descriptor table generated by wireless microcontroller 410.

In the illustrated example, switch fabric 422 communicatively couples the components of wireless communication system 400. Switch fabric 422 comprises an array of switches arranged, for example, in a matrix configuration. Inputs to switch fabric 422 may be connected to outputs by closing switches in a configuration that connects the input and output. Isolation microcontroller 412 is communicatively coupled to shared memory 402 and wireless memory 418 via crossbar switch 422. Wireless microcontroller 410 is communicatively coupled to wireless memory 418 via the crossbar switch 422 and is not communicatively coupled to shared memory 402 (e.g., wireless microcontroller 410 is isolated from shared memory 402). That is, in some examples, switch fabric 422 is configured to not create a data path between wireless microcontroller 410 and shared memory 402.

Figure 5A:
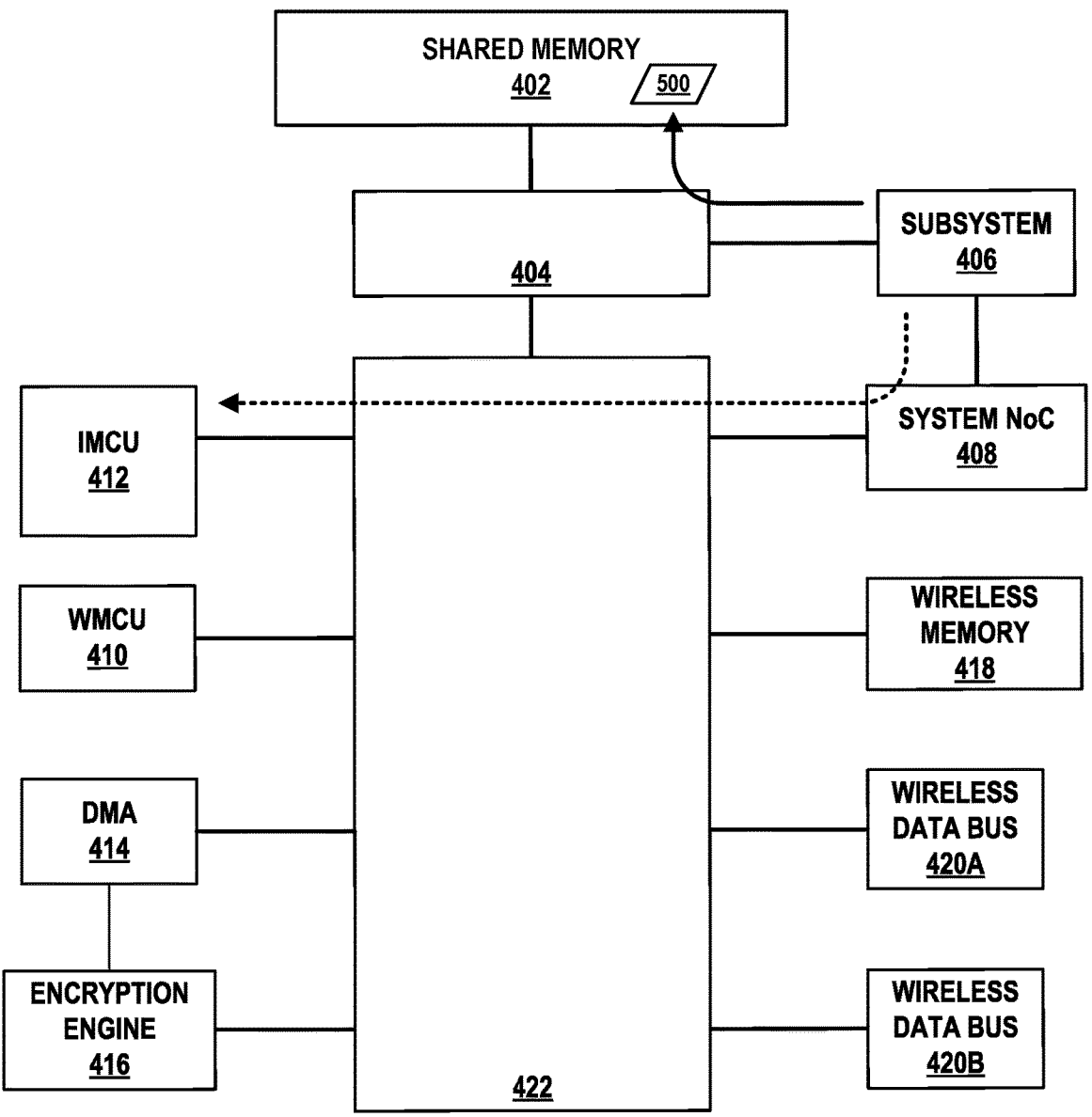
FIGS. 5A-5E are block diagrams illustrating example management of application data by an isolation microcontroller to transmit the application data via a wireless transceiver, in accordance with the techniques described in this disclosure.

FIGS. 5A-5E are block diagrams illustrating example management of application data by isolation microcontroller 412 to transmit application data 500 via a wireless transceiver, in accordance with techniques of this disclosure. In FIG. 5A, subsystem 406 place application data 500 (e.g., an application payload and an application header) into shared memory 402. Subsystem 406 signals (e.g., via an IPC doorbell register) to isolation microcontroller 412 that application data 500 to be transmitted is in shared memory 402. The signal may include a source-destination ID (that indicates the Quality of Service (QoS) level determining the transmission queue over which that payload will be sent) and an address within shared memory 402 at which application data 500 is located.

Figure 5B:
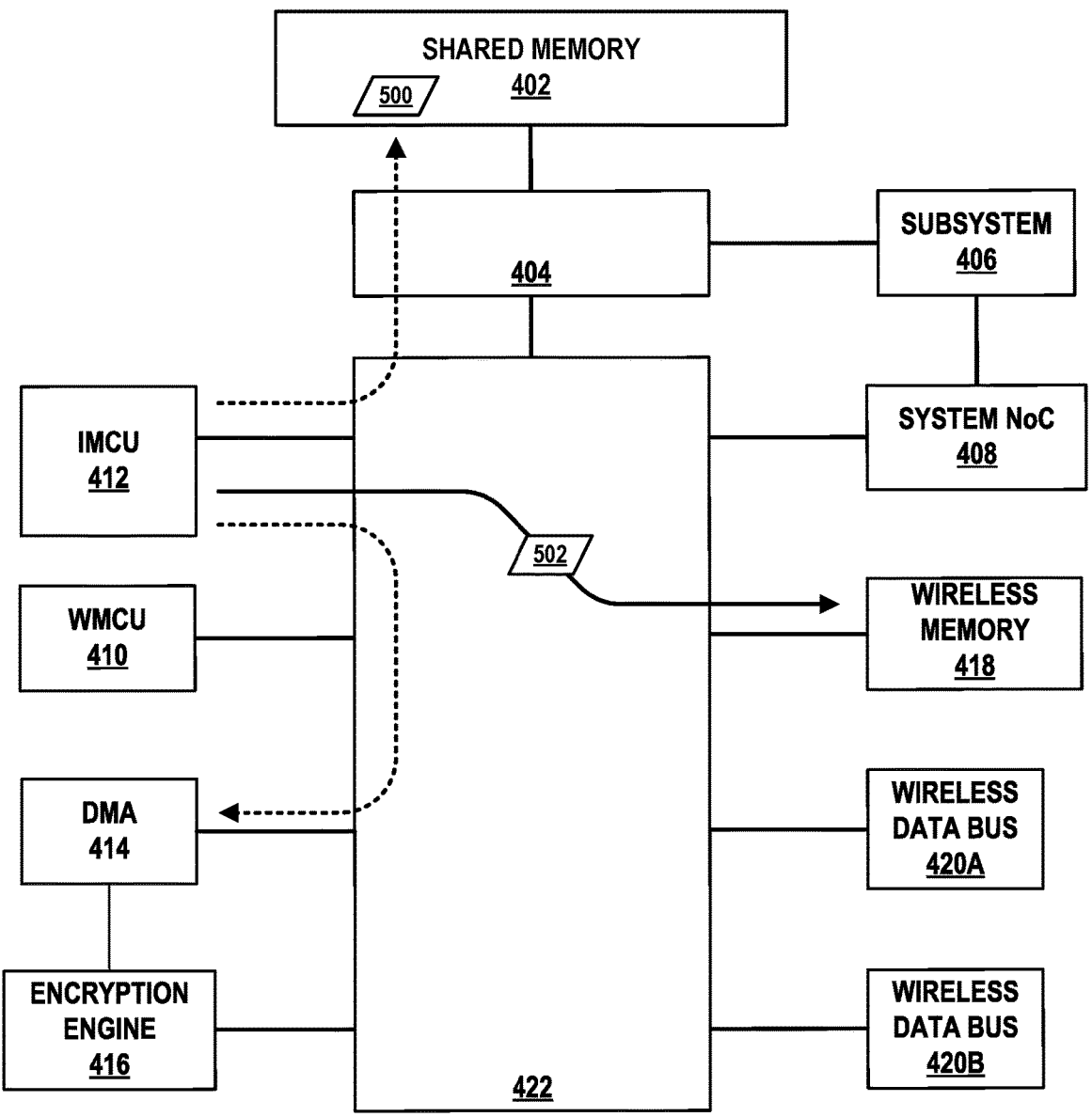

In FIG. 5B, isolation microcontroller 412 determines the number of transmission packets the application data 500 will be split into based on a transmission packet size. Isolation microcontroller 412 then generates partially filled transmission headers 502 and stores the partially filled transmission headers 502 in wireless memory 418. Isolation microcontroller 412 programs DMA controller 414 with the location the packets within application data 500 in shared memory 402 and the location of the corresponding transmission headers 502 in wireless memory 418. In some examples, isolation microcontroller 412 is communicatively coupled to DMA controller 414 through a separate data bus.

Figure 5C:
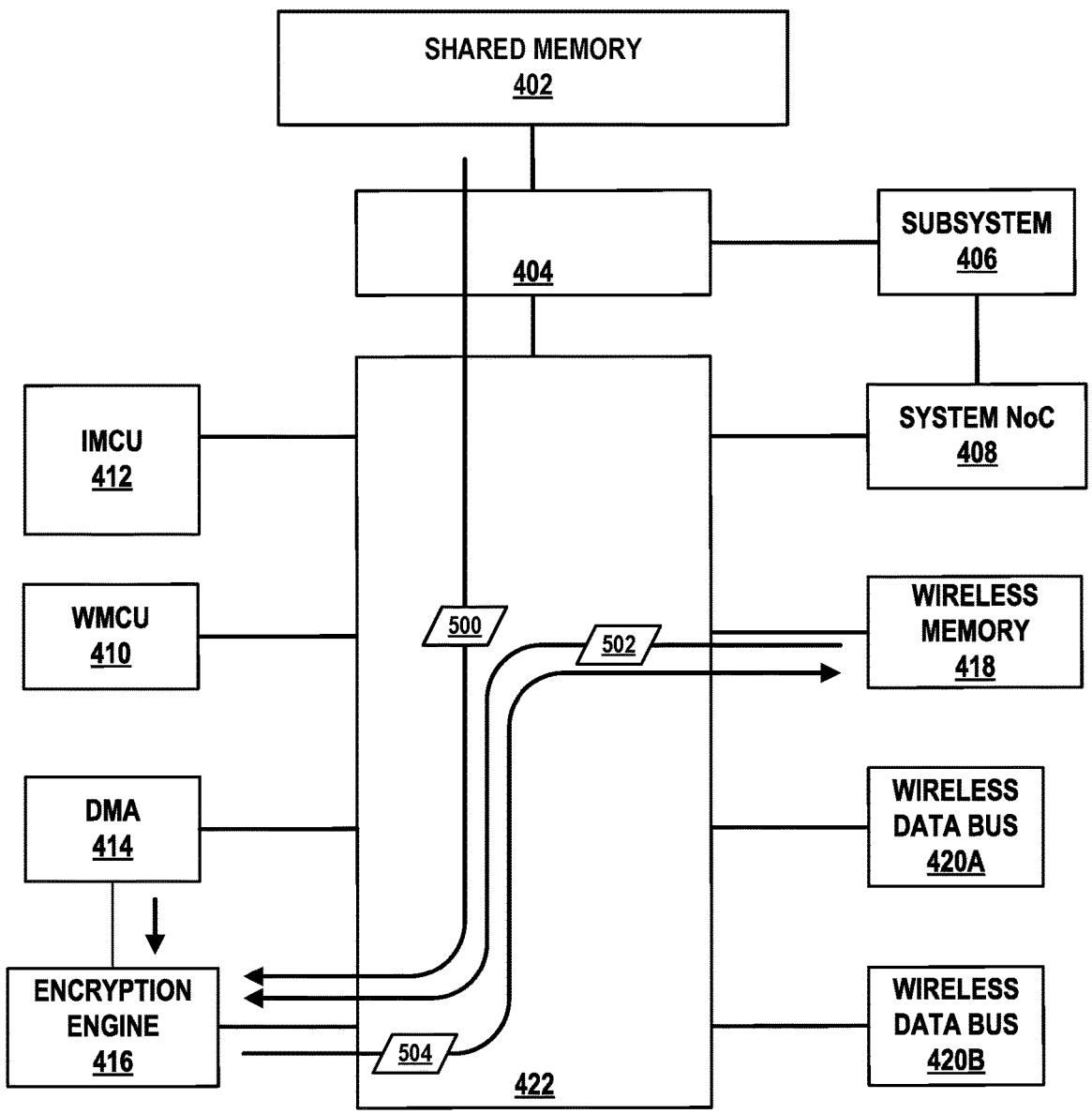

In FIG. 5C, DMA controller 414 pulls packets of application data 500 and partially filled transmission headers 502 through in-line encryption engine 416. In-line encryption engine 416 encrypts the application data packets. In-line encryption engine 416 generates a filled transmission packet by inserting an encryption vector into the partially filled transmission packet. In-line encryption engine 416 creates transmission packets 504 by pairing the encrypted application data packets with the corresponding filled transmission headers, and then places the transmission packets into wireless memory 418.

Figure 5D:
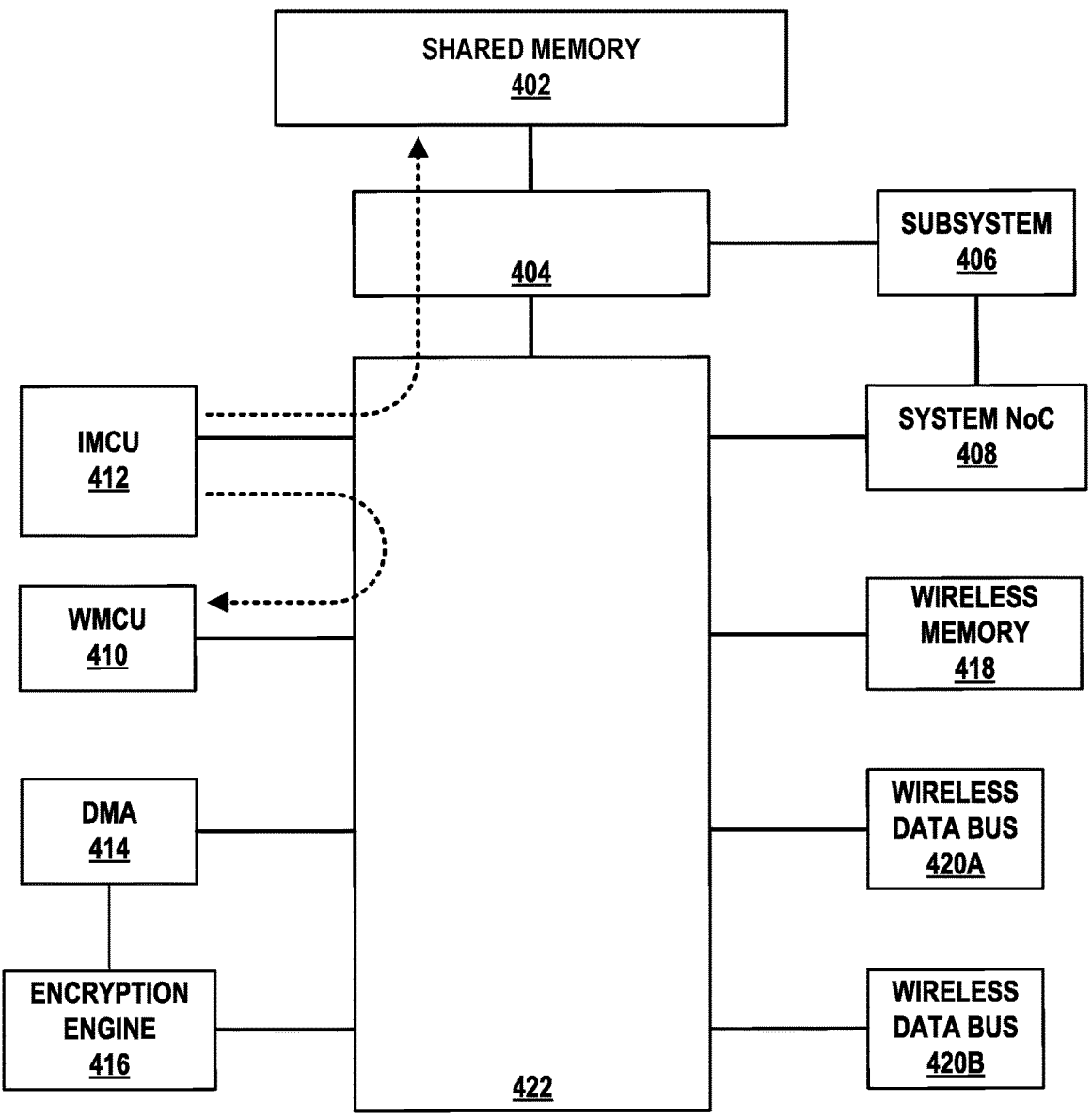

In FIG. 5D, isolation microcontroller 412 sends a signal (e.g., via a doorbell register) that transmission packets 504 are in wireless memory 418 to be transmitted. The signal includes the address(es) in wireless memory 418 in which the transmission packets 504 are located. Isolation microcontroller 412 sends a signal to shared memory 402 to inform shared memory 402 that addresses occupied by application data 500 may be freed up.

Figure 5E:
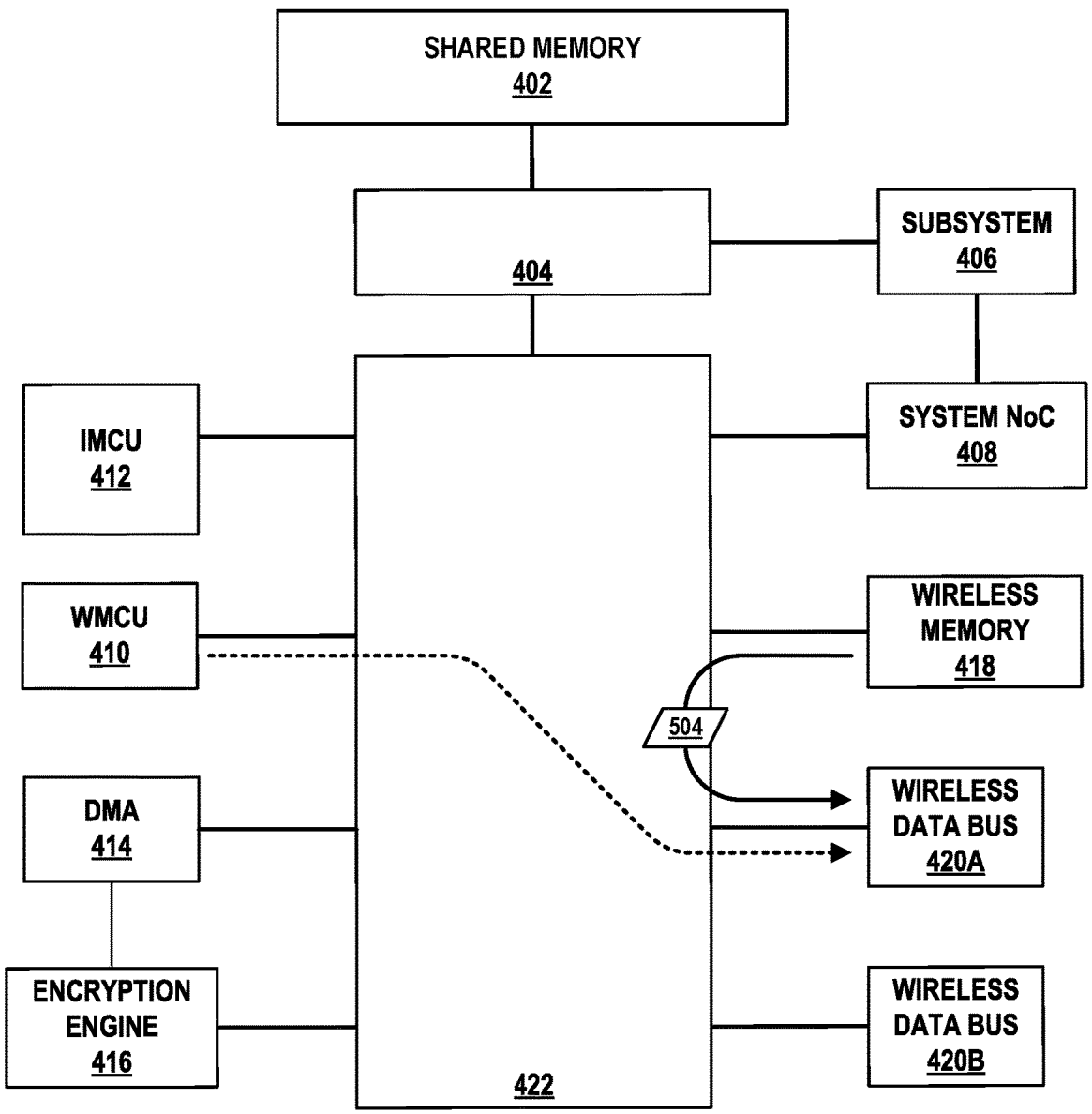

In FIG. 5E, wireless microcontroller 410 WMCU then creates a descriptor table for the wireless data bus interface 420A and 420B to pull transmission packets 504 from wireless memory 418 and sends a signal to wireless data bus interface 420A and 420B. Wireless data bus interface 420A and 420B first pulls the descriptor table from wireless memory 418, and based on the QoS information embedded in the table, assigns a queue to various requests for DMA controllers within the wireless data bus interface 420A and 420B. IN some examples, wireless data bus interface 420A and 420B may launch multiple simultaneous DMA requests if there are multiple different application payloads being processed together. For example, a scatter-gather DMA controller may gather the transmission packets 504 from wireless memory 418.

Figure 6:
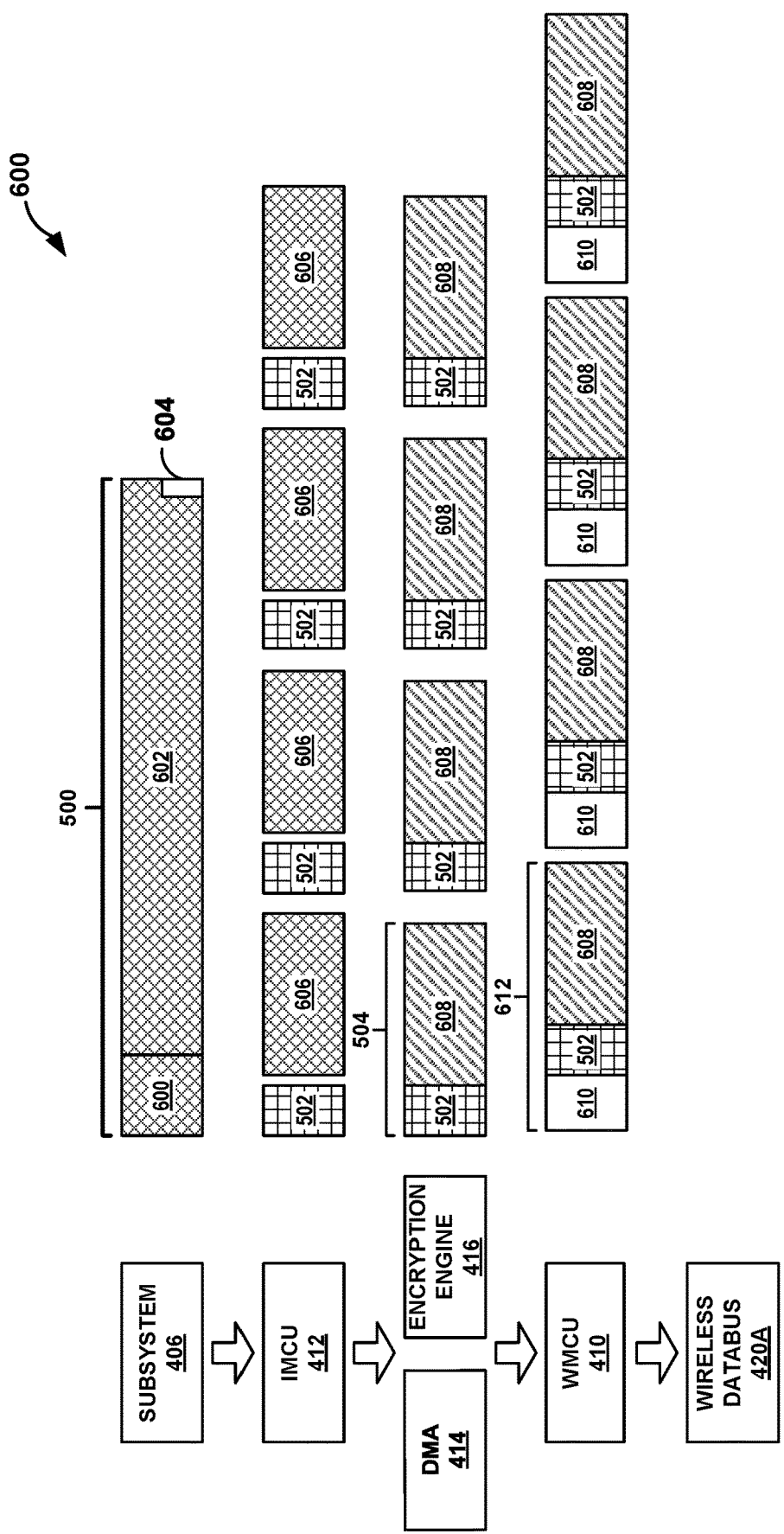
FIG. 6 is a block diagram illustrating an example of data structures and devices for forming wireless packets, in accordance with the techniques described in this disclosure.

FIG. 6 is a block diagram illustrating an example of data structures and devices for forming wireless packets, in accordance with the techniques described in this disclosure. Initially, subsystem 406 places application data 500 into shared memory 402 and sends a signal to isolation microcontroller 412 that includes the location of application data 500. In the illustrated example, application data 500 includes an application header 600 and an application payload 602. Application header 600 includes information (e.g., source-destination ID, length of payload, etc.) (sometimes referred to as "metadata") to enable a destination subsystem to unpack and use application payload 602. In some examples, the total size of the combination of application header 600 and application payload 602 is a multiple of 128 bits when 128 bits is the granularity of encryption engine 416. In some such examples, application payload 602 is padded with dummy bits 604 when the total size is not a multiple of granularity of encryption engine 416 (e.g., 128 bits, etc.).

Isolation microcontroller 412 determines a number of application data packets 606 that application data 500 is to be split into. To define the application data packets, isolation microcontroller 412 (a) determines a starting address in memory for each of the packets 606. and (b) creates transmission headers 502 for each of the packets 606 to store in wireless memory 418. In some examples, the initial application data packet 606 includes application header 600. In some examples, the number of application data packets 606 is determined by the granularity of encryption engine 416 and/or the MTU of wireless communication unit 320A and 320B.

After receiving the location in shared memory 402 of application data packets 606 and the location of transmission headers 502 in wireless memory 418, DMA controller 414 pulls application data packets 606 from shared memory 402 through encryption engine 416 to be encrypted and pulls transmission headers 502 from wireless memory 418 to have an encryption block filled by encryption engine 416. DMA controller 414 create transmission packets 504 by combining encrypted application data packets 608 with the corresponding transmission header 502 and placing transmission packet 504 in wireless memory 418.

Wireless microcontroller 410 drives one of wireless interface bus 420A and 420B to retrieve transmission packets 504 from wireless memory 418 and adds a wireless header 610 to create a wireless packet 612. Wireless microcontroller 410 drives wireless data bus interface 420A and 420B to transmit wireless packet 612.

Figure 7:
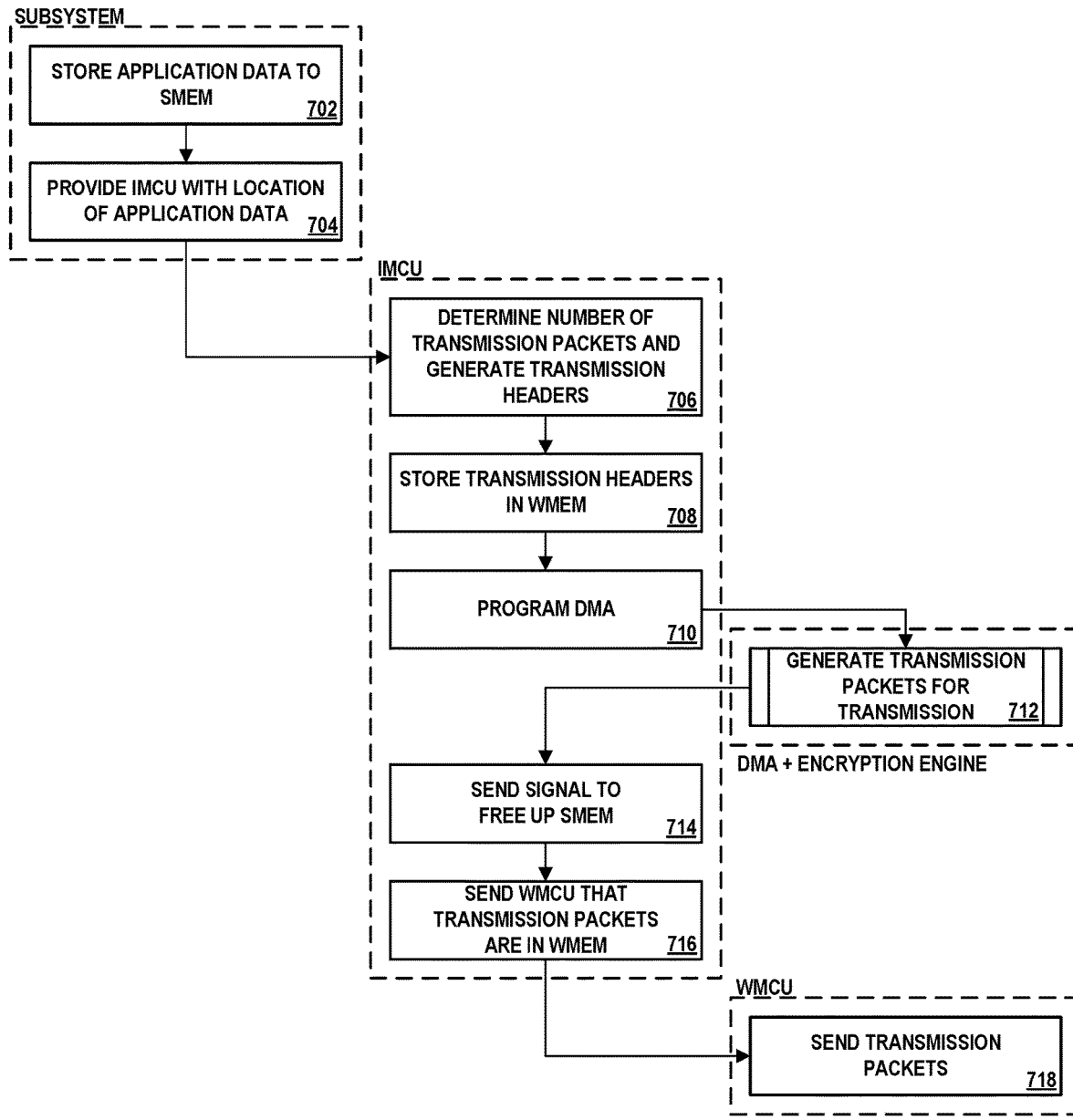
FIG. 7 is a flowchart of an example method to transmit application data stored in shared memory via a wireless transceiver, in accordance with the techniques described in this disclosure.

FIG. 7 is a flowchart of an example method to transmit application data 500 stored in shared memory 402 via a wireless transceiver, in accordance with techniques of this disclosure. Initially, subsystem 406 stores application data 500 to shared memory 402 (702). Subsystem 406 provides isolation microcontroller 412 with a location of application data 500 in shared memory 402 (704).

Isolation microcontroller 412 determines a number of transmission packets 504 that will be generated based on a size of application data 500 and generates initial transmission headers 502 (706). Isolation microcontroller 412 stores transmission headers 502 in wireless memory 418 (708). Isolation microcontroller 412 programs DMA controller 414 with the address in shared memory 402 of application data 500 and the address in wireless memory 418 of transmission headers 502 (710). DMA controller 414 generates transmission packets 504 for transmission (712). An example method of generating transmission packets 504 is described in FIG. 8 below.

When transmission packets 504 are generated, isolation microcontroller 412 sends a signal to shared memory 402 to free up space that was occupied by application data 500 (714). Isolation microcontroller 412 sends a signal to wireless microcontroller 410 with the address in wireless memory 418 of transmission packets 504 (716). Wireless microcontroller 410 drives wireless data bus interface 420A and 420B to transmit transmission packets 504 (e.g., via wireless packets 612) (718).

Figure 8:
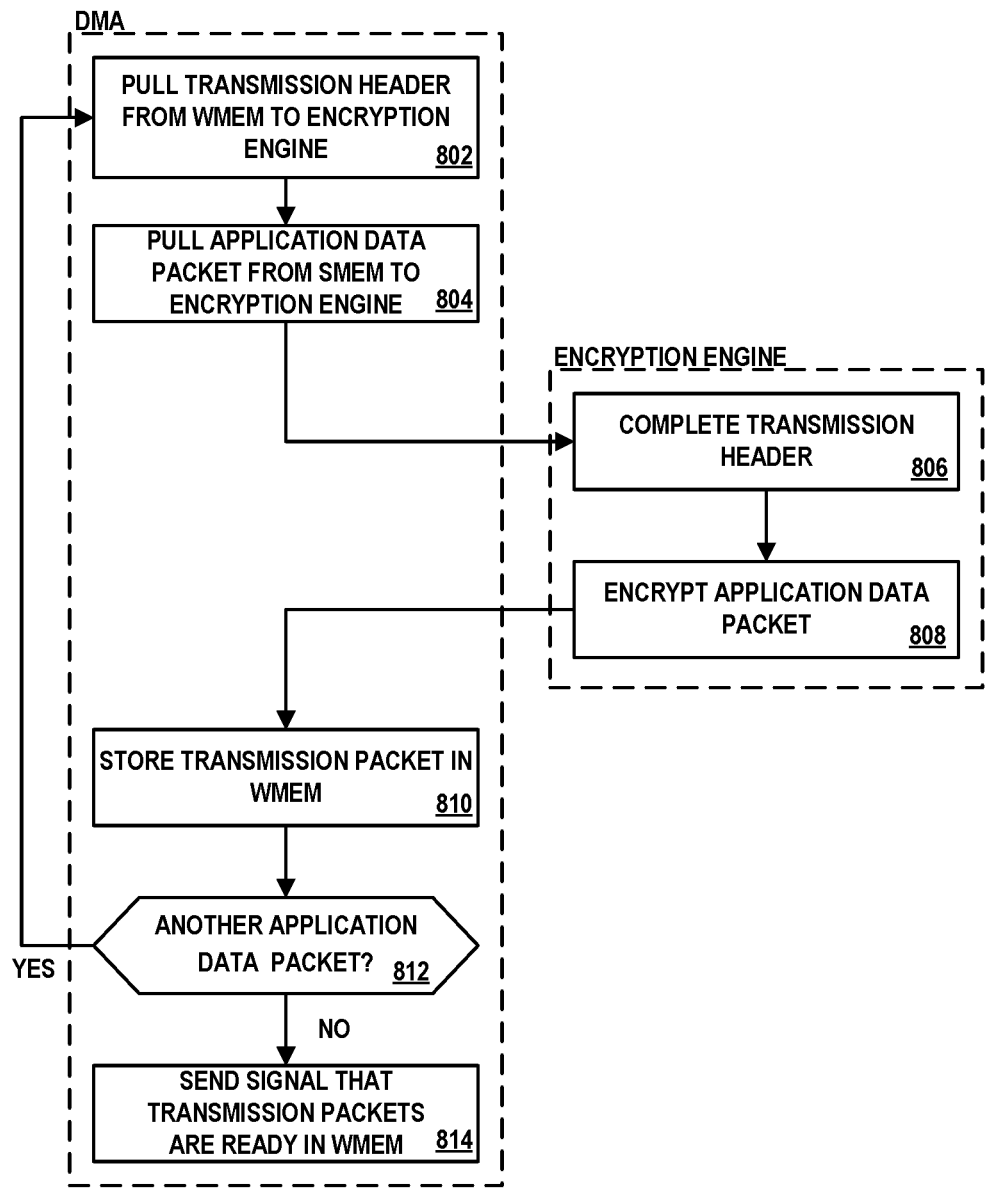
FIG. 8 is a flowchart of an example method to perform inline encryption of application data to be transmitted via a wireless transceiver, in accordance with the techniques described in this disclosure.

FIG. 8 is a flowchart of an example method to perform inline encryption of application data 500 to be transmitted via a wireless transceiver, in accordance with techniques of this disclosure. DMA controller 414 pulls one of transmission headers 502 from wireless memory 418 (802). DMA controller 414 pulls one of application data packets 606 from shared memory 402 (804). Encryption engine 416 completes an encryption block of transmission header 502 and generates encrypted application data packets 608 by encrypting the pulled application data packet 606 (806). DMA controller 414 generates transmission packet 504 by storing transmission header 502 and encrypted application data packets 608 together in wireless memory 418 (808). DMA controller 414 determines whether there is another transmission packet 504 to generate (810). For example, DMA controller 414 may have received more addresses from isolation microcontroller 412. When there are more transmission packets 504 to generate (YES at 812), DMA controller 414 pulls one of transmission headers 502 from wireless memory 418 (802). Otherwise, when there are not more transmission packets 504 to generate (NO at 812), DMA controller 414 sends a signal to isolation microcontroller 412 that transmission packets 504 are ready in wireless memory 418.

Figure 9:
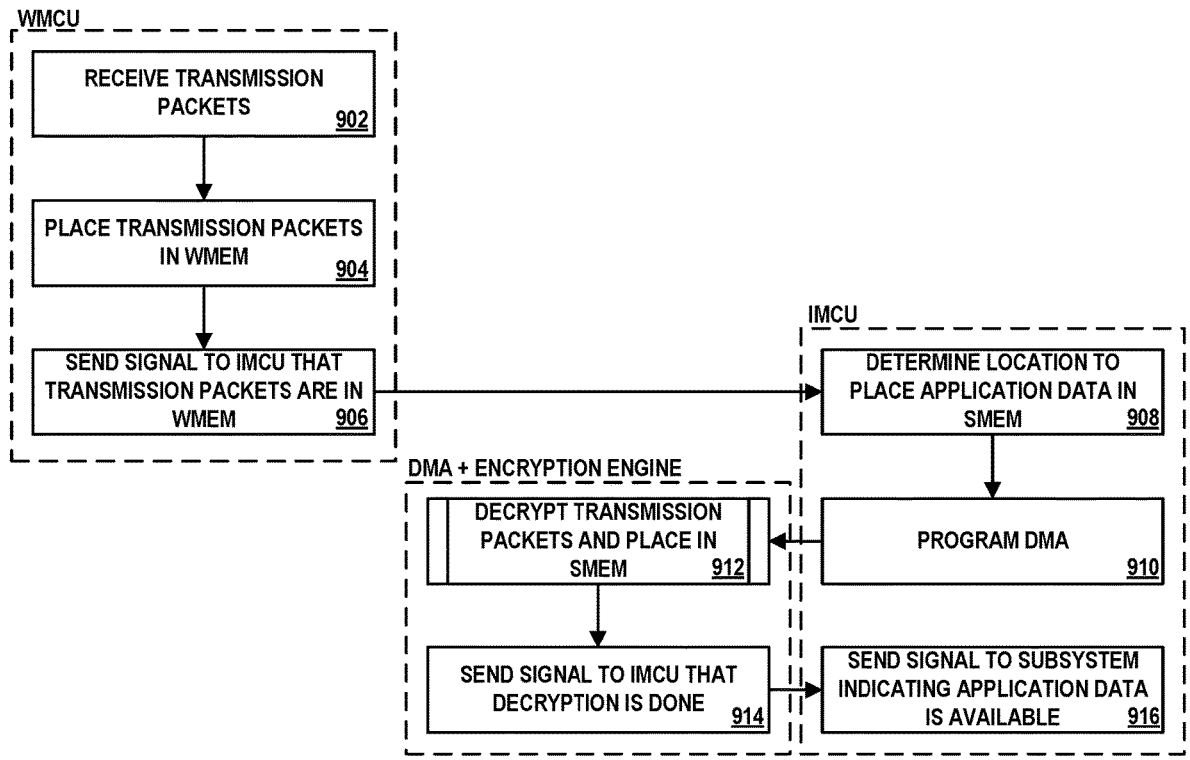
FIG. 9 is a flowchart of an example method to stored application data that is received via a wireless transceiver in shared memory, in accordance with the techniques described in this disclosure.

FIG. 9 is a flowchart of an example method to stored application data 500 that is received via a wireless transceiver in shared memory 402, in accordance with techniques of this disclosure. Initially, wireless microcontroller 410 receives wireless packet 612 via wireless data bus interface 420A and 420B (902). The wireless packet 612 includes wireless header 610 and transmission packet 504 (with transmission header 502 and encrypted application data packet 608). A DMA controller of wireless data bus interface 420A and 420B places the received transmission packet 504 into wireless memory 418 (904). Wireless microcontroller 410 sends a signal to isolation microcontroller 412 that the transmission packets 504 are in wireless memory 418 (906). Isolation microcontroller 412 determines a location in shared memory 402 for the application data 500 included in the transmission packets 504 (908). Isolation microcontroller 412 programs DMA controller 414 to place with the determined location (910). DMA controller 414 and encryption engine 416 decrypt the encrypted application data packet 608 and place the decrypted application data packets 606 into shared memory 402 at the specified location (912). An example method to decrypt the ingress packets is described in FIG. 10 below. DMA controller 414 sends a signal to isolation microcontroller 412 when the application data 500 is reconstructed in shared memory 402 (914). Isolation microcontroller 412 sends a signal to subsystem 406 that application data 500 is in shared memory 402 (916).

Figure 10:
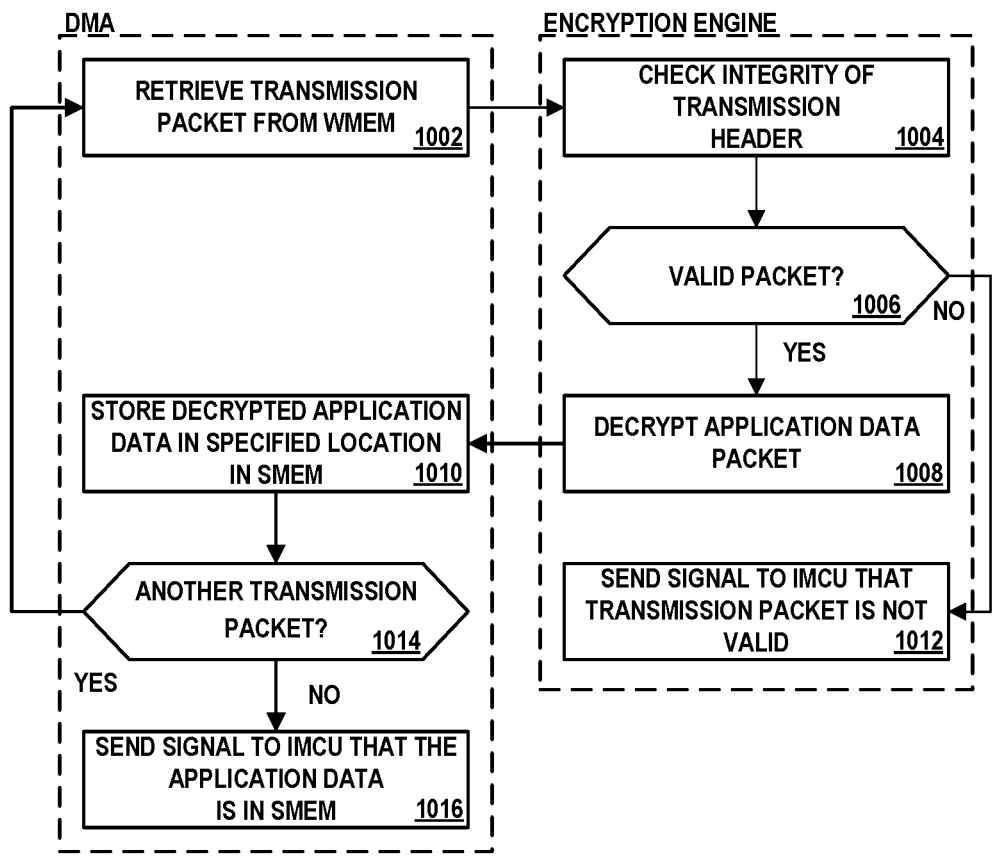
FIG. 10 is a flowchart of an example method to perform inline decryption of application data received via a wireless transceiver, in accordance with the techniques described in this disclosure.

FIG. 10 is a flowchart of an example method to perform inline decryption of application data 500 received via a wireless transceiver. DMA controller 414 pulls one of the transmission packets 504 from wireless memory 418 (1002). Encryption engine 416 checks the integrity of the packet based on transmission header 502 of transmission packet 504 (1006). Encryption engine 416 determines when the transmission packet 504 is valid (1006). In some examples, the encryption block in transmission packet 504 provides values used to determine whether transmission packet 504 is valid. A transmission packet 504 may not be valid, for example, when encryption engine 416 detects that the content of transmission packet 504 has been tampered with. When the transmission packet 504 is valid (YES at 1006), encryption engine 416 decrypts encrypted application data packet 608 within the transmission packet 504 (1008). DMA controller 414 stores the decrypted application data packet 606 in the specified location in shared memory 402 (1010). Otherwise, when the ingress packet is not valid (NO at 1006), encryption engine 416 sends a signal to isolation microcontroller 412 that the transmission packet 504 is not valid (1012). DMA controller 414 determine whether there is another transmission packet 504 in wireless memory 418 (1014). When there is another transmission packet 504 (YES at 1014), DMA controller 414 pulls the next transmission packet 504 from wireless memory 418 (1002). Otherwise, when there is not another transmission packet 504 (NO at 1014), DMA controller 414 sends a signal to isolation microcontroller 412 that application data 500 is reconstructed in shared memory 402 (1016).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A wireless communication system comprising:
    first memory;
    second memory;
    a first microprocessor configured to communicate with other systems that generate application data to be wirelessly transmitted, wherein the application data to be wirelessly transmitted is stored in the second memory;
    a direct memory access (DMA) controller;
    an encryption engine in-line between the DMA controller and the second memory, wherein the first microprocessor is configured to program the DMA controller to transfer packets of the application data to the first memory from the second memory,
    wherein the encryption engine is configured to receive the packets of the application data from the DMA controller, encrypt the packets to generate encrypted application data packets, and output the encrypted application data packets for storage to the first memory;
    a second microprocessor configured to, in response to receiving a signal from the first microprocessor indicating that encrypted application data packets are ready to be transmitted, drive a wireless data bus interface to transmit, via a wireless transceiver, transmission packets each comprising one of the encrypted application data packets.

2. The wireless communication system of claim 1, wherein the first microprocessor is configured to generate a transmission header for each of the packets of the application data, and wherein the transmission packets each comprise one of the encrypted application data packets and a corresponding one of the transmission headers.

3. The wireless communication system of claim 1, wherein the first microprocessor is further configured to:
    determine a number of transmission packets to create based on a size of the application data stored in the second memory;
    generate respective partially filled transmission headers for the transmission packets; and
    store the partially filled transmission headers to the first memory.

4. The wireless communication system of claim 3, wherein the first microprocessor is further configured to generate and store a header table in the first memory, the header table to store a list of addresses that specify locations of the transmission headers in the first memory.

5. The wireless communication system of claim 4, wherein the first microprocessor is configured to program the DMA controller with a descriptor table, the descriptor table specifying (a) a first location in the first memory storing the header table, (b) second locations in the second memory storing the packets of the application data, and (c) a third location in the first memory to store the transmission packets.

6. The wireless communication system of claim 3,
    wherein the DMA controller is configured to retrieve the partially filled transmission headers from the first memory along with corresponding portions of the application data from the second memory, and
    wherein the encryption engine is configured to, for each partially filled transmission header and corresponding portion of the application data, complete the partially filled transmission header with an encryption vector and encrypt the corresponding portion of the application data to create transmission packets to store in the first memory.

7. The wireless communication system of claim 6, wherein the DMA controller is configured to store the transmission packets in a transmission buffer in the first memory to be transmitted by a wireless transceiver.

8. A wireless communication system comprising:
    first memory;
    second memory;
    a first microprocessor;
    a second microprocessor;
    a direct memory access (DMA) controller;

an encryption engine in-line between the DMA controller and the first memory;

wherein the first microprocessor is configured to program, in response to receiving a signal from the second microprocessor indicating that transmission packets have been received by a wireless transceiver and are stored in the first memory, the DMA controller with a first address in the first memory identifying a location of transmission packets and a second address identifying a second location in the second memory;

wherein the DMA controller is configured to pull the transmission packets through the encryption engine to generate application data packets and store the application data packets at the second location of the second memory; and wherein the encryption engine is configured to decrypt encrypted application data packets within the transmission packets.

9. The wireless communication system of claim 8, comprising:

a wireless data bus interface communicatively coupled to a wireless transceiver, wherein the wireless data bus interface is configured to, in response to receiving the transmission packets, store the transmission packets at a location in the first memory; and wherein the second microprocessor is configured to write the locations in first memory of the transmission packets to a register accessible by the first microprocessor.

10. The wireless communication system of claim 8, wherein the encryption engine is configured to, for each one of the transmission packets, determine a validity of the transmission packet based on a transmission header within the transmission packet.

11. The wireless communication system of claim 10, wherein in response to determining that one of the transmission packets is not valid, the encryption engine is configured to send a signal to the first microprocessor and cease processing transmission packets.

12. A method comprising:

pulling from first locations in a first memory, by a direct access memory (DMA) controller, transmission headers to an encryption engine in-line between the DMA controller and a second memory;

pulling from second locations in the second memory, by the DMA controller, packets of application data to the encryption engine;

completing, by the encryption engine, an encryption block within each of the transmission headers;

encrypting, by the encryption engine, the packets of the application data; and storing in third locations in the first memory, by the DMA controller, transmission packets each comprising one of the completed transmission headers and the corresponding encrypted packet of the application data.

13. The method of claim 12, further comprising moving, by a wireless microprocessor, the transmission packets from the third locations in the first memory to a transmission buffer to be transmitted by a wireless receiver.

14. The method of claim 12, further comprising:

determining, by an isolation microprocessor, a number of the application data packets to create based on application data stored in the second locations in the second memory;

generating corresponding ones of the transmission headers for each of the application data packets; and storing the transmission headers to the first locations in the first memory.

15. The method of claim 14, further comprising generating and storing, by the isolation microprocessor, a header table in a fourth location in the first memory, the header table to list address of the first locations in the first memory.

16. The method of claim 15, further comprising providing, by the isolation microprocessor, the header table and the second locations in second memory to the DMA controller.

17. The method of claim 12, wherein completing, the encryption block within each of the transmission headers further comprises generating, by the encryption engine, an encryption vector based on the corresponding application data packet to be encrypted.

18. The method of claim 17, wherein the encryption vector is configured to facilitate, by a receiving device, determining whether the corresponding portion of the application data to be encrypted has been tampered with.

* * * * *